(12) United States Patent
Mele

(10) Patent No.: US 7,866,338 B2
(45) Date of Patent: Jan. 11, 2011

(54) QUICK CONNECT PRESSURE REDUCER/CYLINDER VALVE FOR SELF-CONTAINED BREATHING APPARATUS

(75) Inventor: Ronald B. Mele, Waxhaw, NC (US)

(73) Assignee: STI Licensing Corp., Beachwood, OH (US)

( * ) Notice: Subject to any disclaimer, the term of this patent is extended or adjusted under 35 U.S.C. 154(b) by 403 days.

(21) Appl. No.: 12/111,636

(22) Filed: Apr. 29, 2008

(65) Prior Publication Data
US 2008/0196725 A1   Aug. 21, 2008

Related U.S. Application Data

(60) Division of application No. 11/714,551, filed on Mar. 6, 2007, now Pat. No. 7,370,662, which is a continuation of application No. 10/884,784, filed on Jul. 2, 2004, now Pat. No. 7,191,790.

(60) Provisional application No. 60/485,211, filed on Jul. 4, 2003.

(51) Int. Cl.
*A62B 9/02* (2006.01)

(52) U.S. Cl. ............. 137/507; 137/505.25; 128/205.24; 128/202.27

(58) Field of Classification Search ............ 137/505.25, 137/505, 507; 128/202.27, 205.24, 204.18, 128/207.12
See application file for complete search history.

(56) References Cited

U.S. PATENT DOCUMENTS

| | | | |
|---|---|---|---|
| 2,288,565 A | 6/1942 | Green | |
| 2,406,888 A | 9/1946 | Meidenbauer, Jr. | |
| 3,744,526 A | 7/1973 | MacNiel | |
| 4,328,798 A | 5/1982 | Isaacson | |
| 4,714,077 A | 12/1987 | Lambert | |
| 4,974,584 A | 12/1990 | Goodnoe | |
| 5,213,095 A | 5/1993 | Dague | |
| 5,687,712 A | 11/1997 | Semeia | |
| 5,738,088 A | 4/1998 | Townsend | |
| 6,484,724 B1 | 11/2002 | Sloan | |
| 6,901,958 B2 | 6/2005 | Taylor | |
| 6,929,246 B2 * | 8/2005 | Arzenton et al. | 251/366 |
| 7,263,379 B1 | 8/2007 | Parkulo et al. | |
| 7,628,152 B2 * | 12/2009 | Patterson et al. | 128/204.26 |

* cited by examiner

*Primary Examiner*—Kevin L Lee
(74) *Attorney, Agent, or Firm*—The Small Patent Law Group LLP; Dean D. Small; Charles H. Livingston

(57) ABSTRACT

A breathing air tank and valve assembly is provided for use in a self-contained breathing apparatus. The breathing air tank and valve assembly includes a pressure vessel and a cylinder valve for connection to the pressure vessel. The cylinder valve includes a valve body having an interior, and a first fitting adapted to connect the valve body directly to the pressure vessel, thereby creating a fluid connection to the interior of the valve body. The cylinder valve includes a second fitting that is an outlet adapted to connect the valve body to a pressure reducer assembly, and a third fitting that is an inlet having a check valve. The third fitting is adapted to connect the valve body to an external source of pressurized air and thereby provide a direct air path from the external source of pressurized air through the interior of the valve body to the pressure vessel.

20 Claims, 21 Drawing Sheets

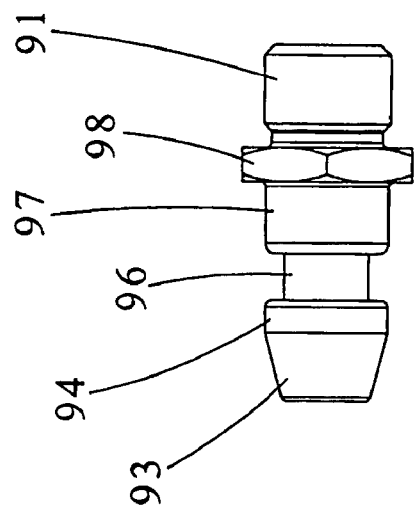
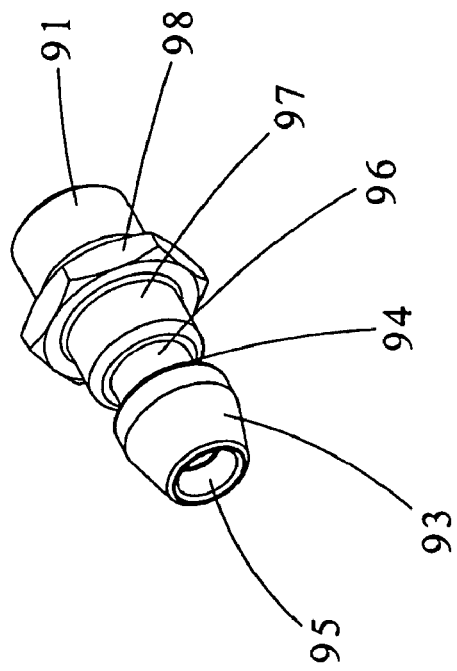
Fig. 12
Fig. 11

QUICK CONNECT PRESSURE REDUCER/CYLINDER VALVE FOR SELF-CONTAINED BREATHING APPARATUS

CROSS-REFERENCE TO RELATED APPLICATION

The present application is a divisional application of U.S. patent application Ser. No. 11/714,551, filed Mar. 6, 2007, now U.S. Pat. No. 7,370,662 which is a continuation application of U.S. patent application Ser. No. 10/884,784, filed Jul. 2, 2004, now U.S. Pat. No. 7,191,790, and which claims priority from U.S. Provisional Patent Application Ser. No. 60/485,211, filed on Jul. 4, 2003, the contents of each of which are herein incorporated by reference in their entirety.

BACKGROUND OF THE PRESENT INVENTION

1. Field of the Present Invention

The present invention relates generally to self-contained breathing apparatuses, and, in particular, to means for quickly and reliably connecting a cylinder valve to a pressure reducer in such an apparatus.

2. Background

Self-contained breathing apparatuses ("SCBA's") are commonly worn by individuals when carrying out activities in hazardous environments, such as when fighting fires and in other smoke- or gas-filled environments, in order to provide the wearer with breathable air. Conventional SCBA's generally include a facepiece, one or more pressurized cylinder or tank, and a hose. The facepiece, which covers the wearer's nose, mouth and eyes and includes a lens for external viewing, is supplied with air from the tanks via the hose. The tanks are secured to the wearer's body by a harness.

Each tank has a rated capacity that is typically a standard value, such as 2216 p.s.i.g or 4500 p.s.i.g., meaning that the pressure in the tank, when full, is approximately the rated capacity. A cylinder valve is attached to each tank to permit pressurized air to be released from the tank when desired. An outlet of the cylinder valve is connected to a first stage pressure reducer which typically reduces the pressure of the air from the then-current pressure (which will be the same or lower than the rated capacity) to a lower level, such as 100 p.s.i.g., and from there through the hose to a second stage pressure reducer, often referred to as a breathing regulator, where the pressure is further reduced to a breathable level. However, some designs utilize only a single pressure reducer for reducing the pressure all the way from the high pressure level of the tank to a breathable level.

Tanks are typically stored fully loaded, or charged, with a cylinder valve in place. However, the rest of the components of the SCBA, including the first stage pressure reducer, normally reside on a user's backframe. When the user needs a new tank, he selects one from storage and installs it on his backframe. The cylinder valve is then connected to the first stage pressure reducer by threading a female CGA fitting, which may be located at the end of a hose that is connected to the first stage pressure reducer, or may be mounted on the first stage pressure reducer itself, to a corresponding male CGA fitting of conventional design, such as a CGA 346 or CGA 347 fitting, on the cylinder valve. Such a fitting is present on virtually all cylinder valves because of various safety standards promulgated by NIOSH, NFPA and the like. Once fully threaded, this connection provides an airtight seal that permits fluid communication between the cylinder valve, and thus the tank, and the first stage pressure reducer.

Unfortunately, the fittings typically include a large number of tightly-spaced threads that require a considerable amount of time and effort to rotate fully into place. This has several drawbacks. First, the process of changing a tank becomes time-consuming, even under the best of circumstances. In the emergency situations that the wearers typically operate in, however, this extra time may be critical to saving life or property. Even worse, if a wearer runs out of air while in a hazardous environment, his safe return may depend on being able to connect to another SCBA wearer's tank, or to a spare tank brought by a rescuer. Not only does the amount of time required to change tanks become particularly critical in such a situation, but such an operation often must take place in heavy smoke or other conditions in which the relatively simple process of threading two fittings together becomes quite difficult. For all of these reasons, a quicker, easier connection means for connecting the cylinder valve of a pressure vessel to the pressure reducer of an SCBA is needed.

Of course, if a different type of fitting or connection means is used to provide the connection between the cylinder valve and the pressure reducer, then it may be useful to provide an additional connection point and fluid access to the interior of the cylinder valve and from there to the pressure vessel, the quick connect fitting, or both. Such a fitting and path could be used to connect an auxiliary air tank to the user's pressure vessel, or to reload the user's regular pressure vessel, without having to disconnect the vessel and cylinder valve from the pressure reducer or remove the SCBA or pressure vessel from his back. Such a connection could bypass the handwheel-controlled valve of the quick connect fitting, making it easier to create air flow into the cylinder valve. In addition, the existence of fittings of two different types provides extra flexibility in connecting the cylinder valve, and further maintains a conventional connection point even if a quick connect fitting is provided. Unfortunately, because known pressure vessels have not heretofore faced such issues, no known pressure vessels provide such an auxiliary fitting.

Another significant consideration when connecting a loaded pressure vessel to a pressure reducer is the pressure present in the vessel. It is important to ensure that a vessel of the proper capacity is connected to the pressure reducer. Conventional pressure reducers are equipped to handle only a single pressure capacity, or have additional functionality that becomes inoperative or improperly operated when used with a pressure vessel of the wrong capacity. In some cases, a higher-than-expected pressure may cause damage to the pressure reducer, while a lower-than-expected pressure may fool the user into thinking that he has more air left than he does. For these reasons and others, a need exists for either a mechanism that prevents a cylinder valve connected to a pressure vessel of a given capacity from being connected to a pressure reducer unless the capacity of the pressure vessel matches the pressure reducer, or a mechanism for permitting a pressure reducer to operate properly with pressure vessels of differing capacities.

Modern SCBA's are increasingly making use of electronics to carry out additional functionality. An example of such an electronics system is disclosed in the commonly-assigned U.S. patent application Ser. No. 10/744,901, entitled "PERSONAL MULTIMEDIA COMMUNICATION SYSTEM AND NETWORK FOR EMERGENCY SERVICES PERSONNEL," the entirety of which is incorporated herein by reference. Unfortunately, existing cylinder valve/pressure reducer connections are unable to communicate with any such electronics system because they include no mechanical/electrical interface for signaling a successful connection to the electronics system. Similarly, even if a pressure reducer capable of handling pressure vessels of more than one different capacity were available, there is no known means of signaling the electronics system as to which type of pressure vessel were connected to the pressure reducer. Of course, on an even simpler level, it may be important to signal the wearer or another user directly as to whether a successful connection has been made between the cylinder valve and the pressure reducer, particularly if a quick connect mechanism such as the one described herein is used. Thus, a further need exists for a simple interface for signaling an SCBA electronics system as to whether a successful connection has been made or as to the capacity of the tank that has been connected to the pressure reducer, or for triggering an audible or visible alarm based on whether a successful connection has been made.

In general, then, a need exists for a quick connect pressure reduction assembly and cylinder valve that may be utilized more quickly and more easily than existing designs and that provides additional functionality over that available with such designs.

SUMMARY OF THE PRESENT INVENTION

The present invention comprises a quick connect cylinder valve and pressure reducer for use in a self-contained breathing apparatus, and includes a cylinder valve and a pressure reducer. The assembly further includes a probe, preferably disposed in the cylinder valve, that has a probe tip and a circumferential notch, and an inlet/latch assembly, preferably disposed in the pressure reducer, that includes a probe tip receptacle for accommodating the probe tip, a pair of latches, each having a shoulder at one end, a grip at the other, and an opening disposed therebetween, and a pair of latch lock pins, operable, in response to a threshold fluid pressure, to be slidably positioned within the openings in the latches. The probe tip may be retained in the probe tip receptacle by positioning the latch shoulders in the circumferential notch, and once the cylinder valve is opened and pressurized gas of a threshold level is flowing therethrough, the latch lock pins prevent the latches from being opened, thereby preventing the probe tip from being withdrawn from the probe tip receptacle.

The present invention further includes an electrical assembly having a pushbutton switch for activating an electronics system, which may include or consist of an audible alarm generator, in the self-contained breathing apparatus. The pushbutton switch is arranged in the inlet/latch assembly such that when the probe tip is latched properly in the probe tip receptacle, the pushbutton switch is depressed, thus activating the electronics system. When the probe tip is not latch properly in the probe tip receptacle, the pushbutton switch is not depressed, thus deactivating the electronics system. In its simplest embodiment, the electronics system is simply an audible alarm generator. However, much more complex electronics may be available, such as that described in the aforementioned U.S. patent application Ser. No. 10/744,901.

Broadly defined, the present invention according to one aspect is a quick connect cylinder valve and pressure reducer for use in a self-contained breathing apparatus, including: a cylinder valve that connects to a pressure vessel; a pressure reduction assembly; a probe having a notch in the side thereof and a threadless probe tip, the probe defining an axis; and an inlet/latch assembly, having a probe tip receptacle for accommodating the probe tip, and a latch, having a shoulder adapted to fit into the notch in the side of the probe and arranged to move transversely relative to the axis of the probe; wherein the probe tip may be retained in the probe tip receptacle, thereby creating an air path between the cylinder valve and the pressure reduction assembly, by positioning the latch shoulder in the notch.

In features of this aspect, the notch is a circumferential notch; the at least one latch is a pair of latches, each having a shoulder adapted to fit into the circumferential notch; the inlet/latch assembly further includes a spring that biases the latch shoulder toward the notch; the probe tip is tapered so as to force the spring-biased latch aside as the probe tip is inserted into the probe tip receptacle; the at least one spring-biased latch includes a grip adapted for manipulation by a user to release the probe tip from the latch shoulder; the inlet/latch assembly further includes an additional spring that forces the probe tip at least partly out of the probe tip receptacle upon release of the probe tip from the latch shoulder; the latch has an opening disposed therein, and wherein the inlet/latch assembly further includes a latch lock pin operable, in response to a threshold fluid pressure, to be slidably positioned within the opening in the latch; the latch lock pin is subjected to the pressure of air entering the reducer through the inlet; the latch lock pin is biased away from the opening in the latch, thereby releasing the latch when the pressure of the air entering the reducer through the inlet is insufficient to overcome the biasing force; and the threshold fluid pressure is approximately 50 p.s.i.g.

According to another aspect, the present invention is a method of coupling a pressure vessel into a self-contained breathing apparatus, including: providing a cylinder valve attached in fluid communication with a pressure vessel; providing a pressure reduction assembly; providing a probe, attached in fluid communication with either the cylinder valve or the pressure reduction assembly, having a notch in the side thereof and a threadless probe tip, the probe defining an axis; providing an inlet/latch assembly, attached in fluid communication with the other of the cylinder valve and the pressure reduction assembly, having a probe tip receptacle, with an entrance, for accommodating the probe tip, and a latch, with a shoulder adapted to fit into the notch in the side of the probe and arranged to move transversely relative to the axis of the probe; and positioning the probe tip at the entrance of the probe tip receptacle; with the latch shoulder in an open position, inserting the probe tip into the probe tip receptacle; and once the probe tip is fully inserted into the probe tip receptacle, moving the latch shoulder toward the probe until the latch shoulder is positioned in the notch, thereby retaining the probe tip within the probe tip receptacle and establishing fluid communication between the pressure reduction assembly and the cylinder valve.

In features of this aspect, the movement of the latch shoulder toward the probe occurs in a first direction, and the method further includes, before inserting the probe tip into the probe tip receptacle, moving the latch shoulder in a second direction, the second direction being opposite the first direction, to the open position; the method further includes, upon establishing fluid communication between the pressure reduction assembly and the cylinder valve, opening the cylinder valve, thereby supplying pressurized air to the pressure reduction assembly; and the method further includes, upon supplying pressurized air to the pressure reduction assembly, applying air pressure to a latch lock pin, thereby overcoming a counteracting bias and causing the latch lock pin to move into an interlocked relationship with the latch.

In another aspect, the present invention is a universal cylinder valve and pressure reducer for use in a self-contained breathing apparatus, including: a cylinder valve that connects to a pressure vessel; a pressure reduction assembly; a first probe having a probe tip of a first length; a second probe having a probe tip of a second length, the second length being different from the first length; and an inlet/connector assembly, having a probe tip receptacle adapted to receive the probe tip of the first probe at a first depth therein and to establish a fluid connection therewith, and further adapted to receive the probe tip of the second probe at a second depth therein and to establish a fluid connection therewith, and a connector adapted to retain the first probe at the first depth when the first probe is inserted in the probe tip receptacle, and adapted to retain the second probe at the second depth when the second probe is inserted in the probe tip receptacle.

In features of this aspect, the first probe and the second probe are each mountable to the cylinder valve, and the inlet/latch assembly is connected to the pressure reducer; the connector is a latch; each of the first and second probes includes a notch, and the latch includes a latch shoulder configured to fit into the notch of the probe that is inserted in the probe tip receptacle; each notch is disposed in the side of the respective probe, the probe defines a central axis, and the latch shoulder is movable in a direction transverse to the central axis of the probe; the connector is a threaded fitting; the inlet/latch assembly includes an inlet nozzle disposed in the probe tip receptacle; the first and second probes each include a hollow in the respective probe tip thereof, each hollow being adapted to receive the distal end of the inlet nozzle when the respective probe is inserted into the probe tip receptacle; the inlet/latch assembly further includes a disk coaxially arranged around the inlet nozzle; and the disk is spring-loaded.

In another aspect, the present invention is a method of coupling a pressure vessel into a self-contained breathing apparatus, including: designating a first probe size for use with pressure vessels of a first rated capacity; designating a second probe size for use with pressure vessels of a second rated capacity, the first and second probe sizes being different from one another; providing a pressure vessel having a known rated capacity, the known rated capacity being either the first rated capacity or the second rated capacity; providing a cylinder valve having a probe of a size selected to correspond with the rated capacity of the pressure vessel; and providing a pressure reducer that includes an inlet assembly, having a probe tip receptacle, adapted to receive the probe tip of the probe, regardless of whether the size of the probe is the first probe size or the second probe size, and to establish a fluid connection therewith.

In features of this aspect, the method further includes receiving, in the probe tip receptacle, the probe tip of the provided probe, regardless of whether the size of the probe is the first probe size or the second probe size; and establishing a fluid connection between the pressure reducer and the pressure vessel via the inlet assembly and the probe; the method further includes automatically controlling the operation of the pressure reducer at least partly on the basis of the size of the probe whose tip is received in the probe tip receptacle; providing a cylinder valve having a probe includes providing a cylinder valve having a probe that has a threadless probe tip; the pressure vessel is of the first rated capacity and the probe is of the first probe size; the probe is a first probe and the pressure vessel is a first pressure vessel, and the method further includes removing the first probe from the probe tip receptacle of the inlet assembly, providing a second pressure vessel, the second pressure vessel being of the second rated capacity, providing a cylinder valve having a second probe of the second probe size, receiving, in the probe tip receptacle, the probe tip of the second provided probe, and establishing a fluid connection between the pressure reducer and the second pressure vessel via the inlet assembly and the second probe; providing a cylinder valve having a second probe includes providing a cylinder valve having a second probe that has a threadless probe tip; and the pressure vessel is of the second rated capacity and the probe is of the second probe size.

In yet another aspect, the present invention is a universal pressure reducer for a self-contained breathing apparatus, including: an inlet adapted to couple the universal pressure reducer to a cylinder valve connected to a pressure vessel of a rated capacity; a primary reducer module in fluid communication with the inlet; a pneumatic alarm mechanism; a pneumatic transfer valve assembly that controls the actuation of the alarm mechanism by controlling the flow of pressurized air thereto, wherein the transfer valve assembly is arranged to actuate the alarm mechanism when the pressure of air entering the reducer through the inlet drops to a trigger level that is automatically selected from at least a first predetermined level and a second predetermined level, the trigger level being set to the first predetermined level if the inlet is coupled to a cylinder valve connected to a pressure vessel of a first rated capacity, and being set to a second predetermined level if the inlet is coupled to a cylinder valve connected to a pressure vessel of a second rated capacity, the first and second rated capacities being different from one another and the first and second predetermined levels being different from one another.

In features of this aspect, the universal pressure reducer further includes a selector valve assembly that automatically controls the actuation of the transfer valve assembly on the basis of the rated capacity of the pressure vessel connected to the cylinder valve to which the inlet is coupled; the selector valve assembly controls the actuation of the transfer valve assembly by controlling the flow of pressurized air thereto; the selector valve assembly is arranged to permit the flow of pressurized air from the inlet to the transfer valve assembly at a first flow volume if the pressure vessel is of the first rated capacity and at a second flow volume if the pressure vessel is of the second rated capacity, the first and second flow volumes being different from one another; the universal pressure reducer further includes a secondary reducer module; the selector valve assembly is controlled mechanically; the selector valve assembly is adjustable between at least two positions, and wherein operation of the selector valve assembly to control actuation of the transfer valve assembly is based on the position of the selector valve assembly; adjustment of the position of the selector valve assembly is caused by coupling the inlet to the cylinder valve; the selector valve assembly is controlled electrically; movement of the selector valve assembly is caused by a motor; the motor is controlled by a pushbutton switch triggered when the inlet is coupled to the cylinder valve; the first predetermined level is ¼ of the first rated capacity, and the second predetermined level is ¼ of the second rated capacity; the transfer valve assembly is controlled electrically; the universal pressure reducer further includes a motor operable to assist pneumatic control of the transfer valve assembly.

In another aspect, the present invention is a method of coupling a pressure vessel into a self-contained breathing apparatus, including: designating a first probe size for use with pressure vessels of a first rated capacity; designating a second probe size for use with pressure vessels of a second rated capacity, the first and second probe sizes being different from one another; providing a pressure vessel having a known rated capacity, the known rated capacity being either the first rated capacity or the second rated capacity; providing a cylinder valve having a probe, having a threadless probe tip, of a size selected to correspond with the rated capacity of the pressure vessel; and providing a pressure reducer that includes an inlet assembly, having a probe tip receptacle, configured to receive the probe tip of a probe of one or the other of the first probe size and the second probe size, but not both, and establish a fluid connection therewith, and further configured to prevent the establishment of a fluid connection with a probe of the other probe size.

In features of this aspect, the method further includes sliding the probe into the probe tip receptacle, thereby establishing the fluid connection between the pressure reducer and the probe; and the method further includes latching the probe in place in the probe tip receptacle.

In still another aspect, the present invention is a self-contained breathing apparatus, including: a tank having an outlet; a cylinder valve mounted at the outlet of the tank; a pressure reducer; a probe having a probe tip; an inlet/latch assembly having a probe tip receptacle; and an electrical assembly having a pushbutton switch arranged in the inlet/latch assembly and actuated by the insertion of the probe tip into the probe tip receptacle.

In features of this aspect, the pushbutton switch controls the transmission of at least one electrical signal to an electronics system when the probe tip is successfully latched in the probe tip receptacle; the probe is carried on the cylinder valve; wherein the inlet/latch assembly is carried on the pressure reducer; the inlet/latch assembly further includes a contact member, disposed within the inlet-latch assembly and adapted to be inwardly displaced, thereby actuating the pushbutton switch, when the probe tip is inserted into the probe tip receptacle; the contact member is a disk having a skirt; the inlet/latch assembly further includes an inlet nozzle, and the disk is coaxially arranged around the inlet nozzle; the disk is spring-loaded; the spring-loaded disk causes the probe tip to be outwardly biased when inserted into the probe tip receptacle; and the pushbutton switch and the contact member are configured such that the pushbutton switch is actuated only when the contact member is inwardly displaced by a predetermined distance, the predetermined distance corresponding to the displacement caused when the probe tip is successfully latched in the probe tip receptacle.

In another aspect, the present invention is a self-contained breathing apparatus, including: a tank having an outlet and a rated capacity for pressurized air; a cylinder valve mounted at the outlet of the tank; a pressure reducer; an electronics system; and an electrical assembly that transmits a signal to the electronics system when the cylinder valve is connected to the pressure reducer.

In features of this aspect, the signal transmitted by the electrical assembly to the electronics system is indicative of a successful connection between the cylinder valve and the pressure reducer; the electrical assembly is arranged to transmit a signal only when the cylinder valve is successfully connected to the pressure reducer; the electrical assembly is arranged to transmit a first signal when the cylinder valve is successfully connected to the pressure reducer, and a second signal when the cylinder valve is not successfully connected to the pressure reducer; the electrical assembly includes a pushbutton switch that is actuated by the cylinder valve; the cylinder valve includes a probe that actuates the pushbutton switch when the cylinder valve is successfully connected to the pressure reducer; the signal transmitted by the electrical assembly to the electronics system is indicative of the capacity of the tank; the electrical assembly is arranged to transmit a signal only when the tank to which the cylinder valve is mounted is of a first capacity, and is arranged not to transmit a signal when the tank to which the cylinder valve is mounted is of a second capacity, the first and second capacities being different from one another; the electrical assembly is arranged to transmit a first signal when the tank to which the cylinder valve is mounted is of a first capacity, and a second signal when the tank to which the cylinder valve is mounted is of a second capacity; the electrical assembly includes a pushbutton switch that is actuated by the cylinder valve; the cylinder valve includes a probe that actuates the pushbutton switch when the cylinder valve is successfully connected to the pressure reducer; and the electronics system includes an audible alarm generator activated and deactivated by the pushbutton switch.

In still another aspect, the present invention is a breathing air tank and valve assembly for use in a self-contained breathing apparatus, including: a pressure vessel; and a cylinder valve for connection to the pressure vessel, the cylinder valve including a valve body having an interior; a first fitting adapted to connect the valve body directly to the pressure vessel, thereby creating a fluid connection to the interior of the valve body; a second fitting, the second fitting being an outlet adapted to connect the valve body to a pressure reducer assembly; a valve assembly adjustable between at least an open state and a closed state, wherein in the open state, an air path exists from the pressure vessel through the interior of the valve body to the second fitting, and in the closed state, no air path exists from the pressure vessel through the interior of the valve body to the second fitting; and a third fitting, the third fitting being an inlet, having a check valve, adapted to connect the valve body to an external source of pressurized air, thereby providing a direct air path from the external source of pressurized air through the interior of the valve body to the pressure vessel.

In features of this aspect, the second fitting is a quick-connect probe for threadless connection to a pressure reducer assembly; the third fitting includes a conventional threaded fitting for connection to the external pressurized air source; the third fitting is a CGA-type fitting; the direct air path from the external pressurized air source through the interior of the valve body to the pressure vessel exists regardless of whether the valve assembly is in its open state or its closed state; the valve assembly includes a handwheel for adjusting the valve assembly between its open state and its closed state; the quick-connect probe includes a probe tip and a notch interposed between the probe tip and the valve body; the notch is a circumferential notch; the quick-connect probe may be temporarily connected to the valve body by a threaded fitting; and the quick-connect probe is permanently connected to the valve body.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein:

FIG. 11 is a perspective view of the probe of FIG. 6, shown in isolation;

FIG. 12 is a left side plan view of the probe of FIG. 11;

DETAILED DESCRIPTION OF THE PREFERRED EMBODIMENTS

Figure 1:
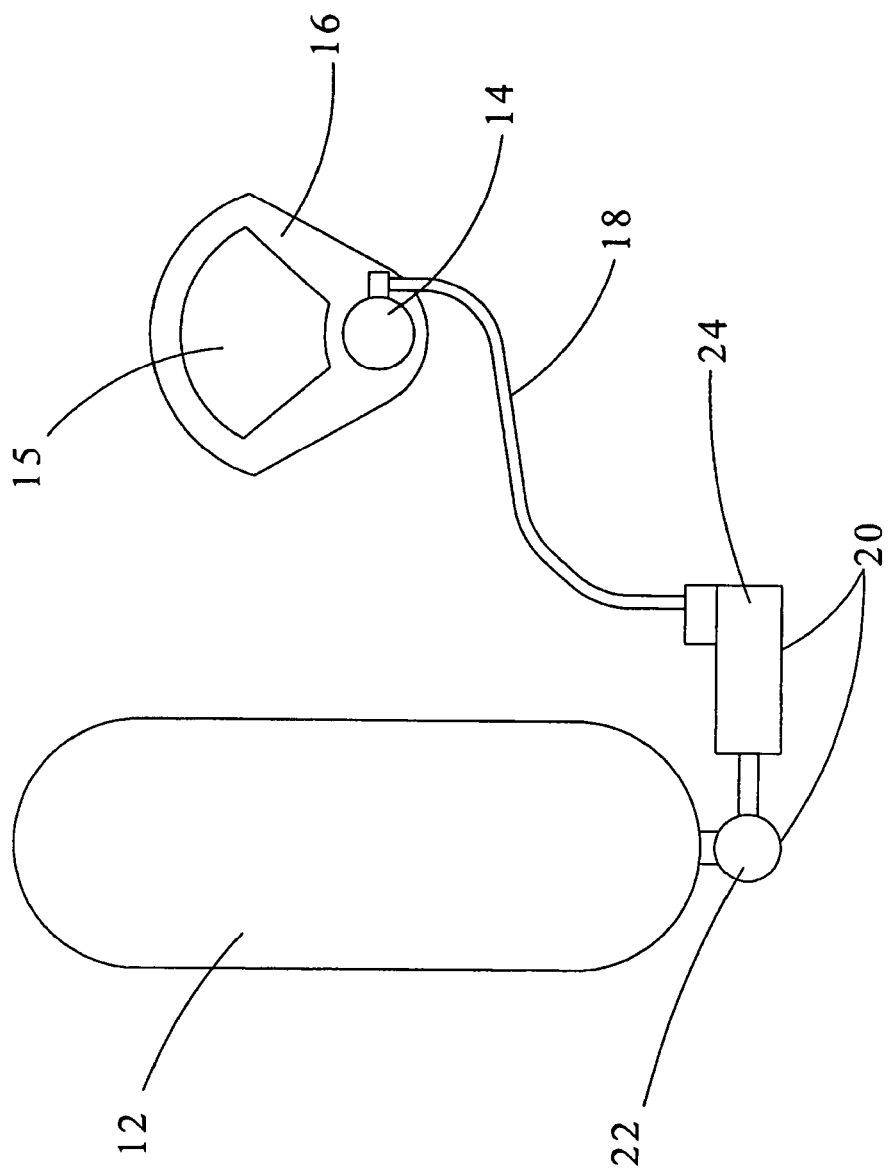
FIG. 1 is a block diagram of a self-contained breathing apparatus incorporating a quick connect valve and pressure reducer, in accordance with the preferred embodiments of the present invention.

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

FIG. 1 is a block diagram of a self-contained breathing apparatus ("SCBA") 10 carried by firefighters, other emergency services workers, and the like, that incorporates a quick connect valve and pressure reducer 20, in accordance with the preferred embodiments of the present invention. The SCBA 10 includes one or more pressure vessel 12, the quick connect valve and pressure reducer 20, a second stage pressure reduction assembly or regulator 14, a facepiece 16 and a hose assembly 18. The pressure vessel 12 is a pressurized cylinder or tank that provides a supply of breathing gas to the wearer. In one preferred form of the invention the tank 12 may be of a type that initially holds air at a pressure of about 316.4 kg/sq.cm. (4500 p.s.i.g.) or another standard capacity. The quick connect valve and pressure reducer 20 is disposed at the outlet of the tank 12 and in fluid communication therewith.

The hose assembly 18 is connected between the quick connect valve and pressure reducer 20 and the facepiece 16 via the second stage regulator 14. This breathing regulator 14, which is preferably disposed on the facepiece 16 as seen schematically in FIG. 1, includes a regulator chamber (not shown) in fluid communication with the hose assembly 18. The facepiece 16 covers the wearer's nose and mouth in airtight connection, and preferably covers the wearer's eyes with a transparent shield 15 for external viewing. The second stage regulator 14 may be any one of a number of conventional or novel types, including demand type regulators or positive pressure type regulators.

In addition, the SCBA preferably includes an electronics system (not shown). In its simplest embodiment, the electronics system is simply an audible alarm generator. The audible alarm generator may be triggered under certain conditions, such as described hereinbelow. However, much more complex electronics may be available, such as that described in the aforementioned U.S. patent application Ser. No. 10/744,901.

Figure 2:
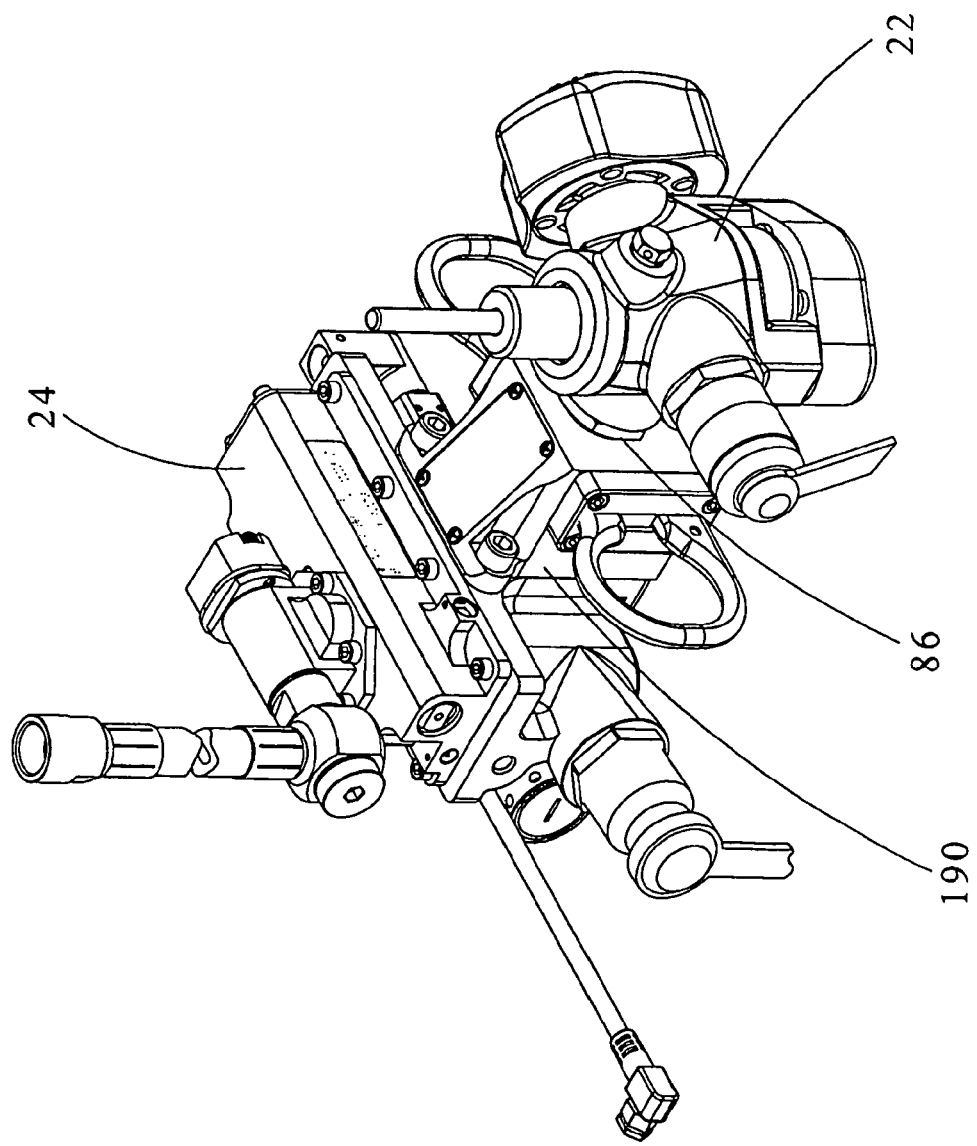
FIG. 2 is a perspective view of the quick connect valve and pressure reducer of FIG. 1.
Figure 3:
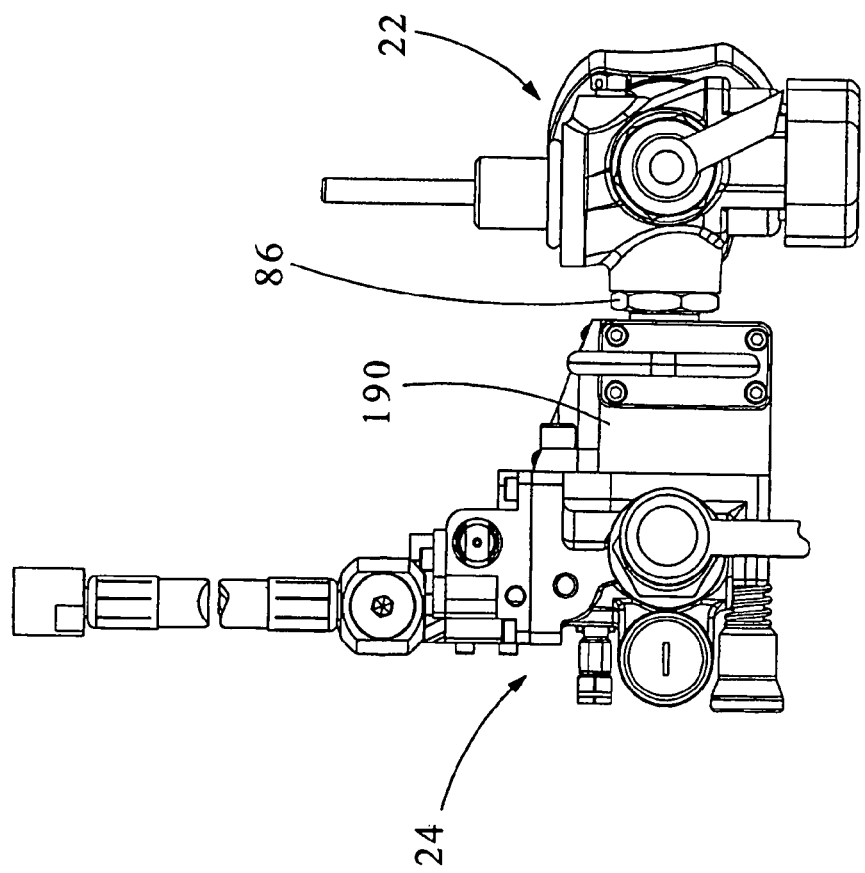
FIG. 3 is a side plan view of the quick connect valve and pressure reducer of FIG. 2.
Figure 4:
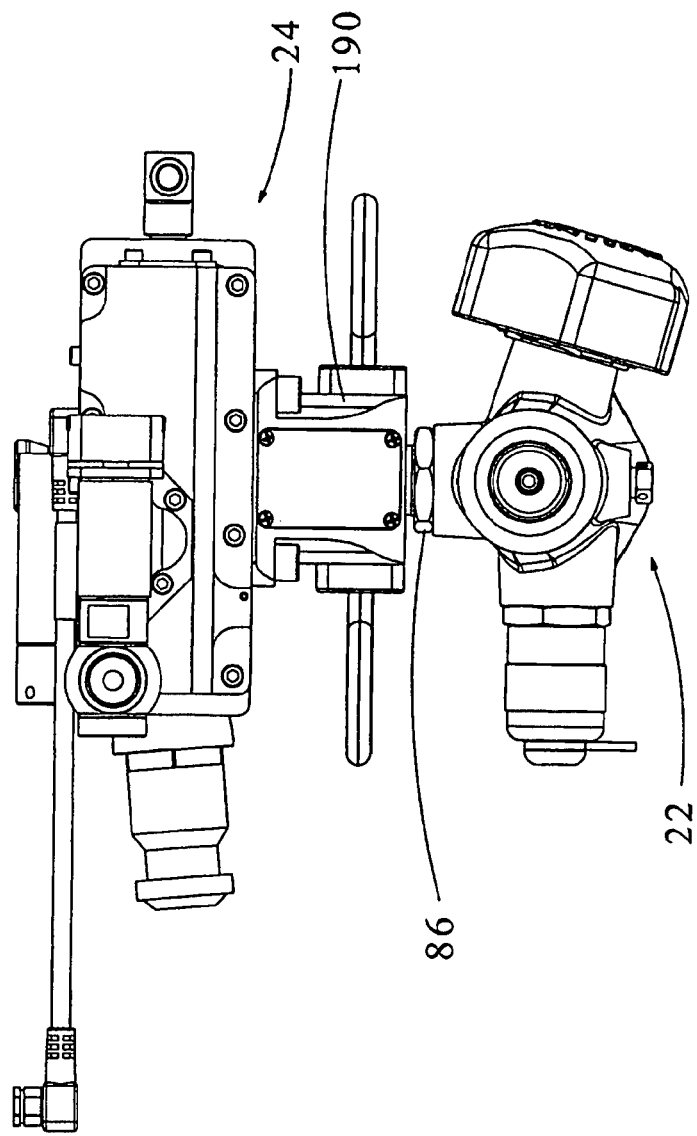
FIG. 4 is a top plan view of the quick connect valve and pressure reducer of FIG. 2.
Figure 5:
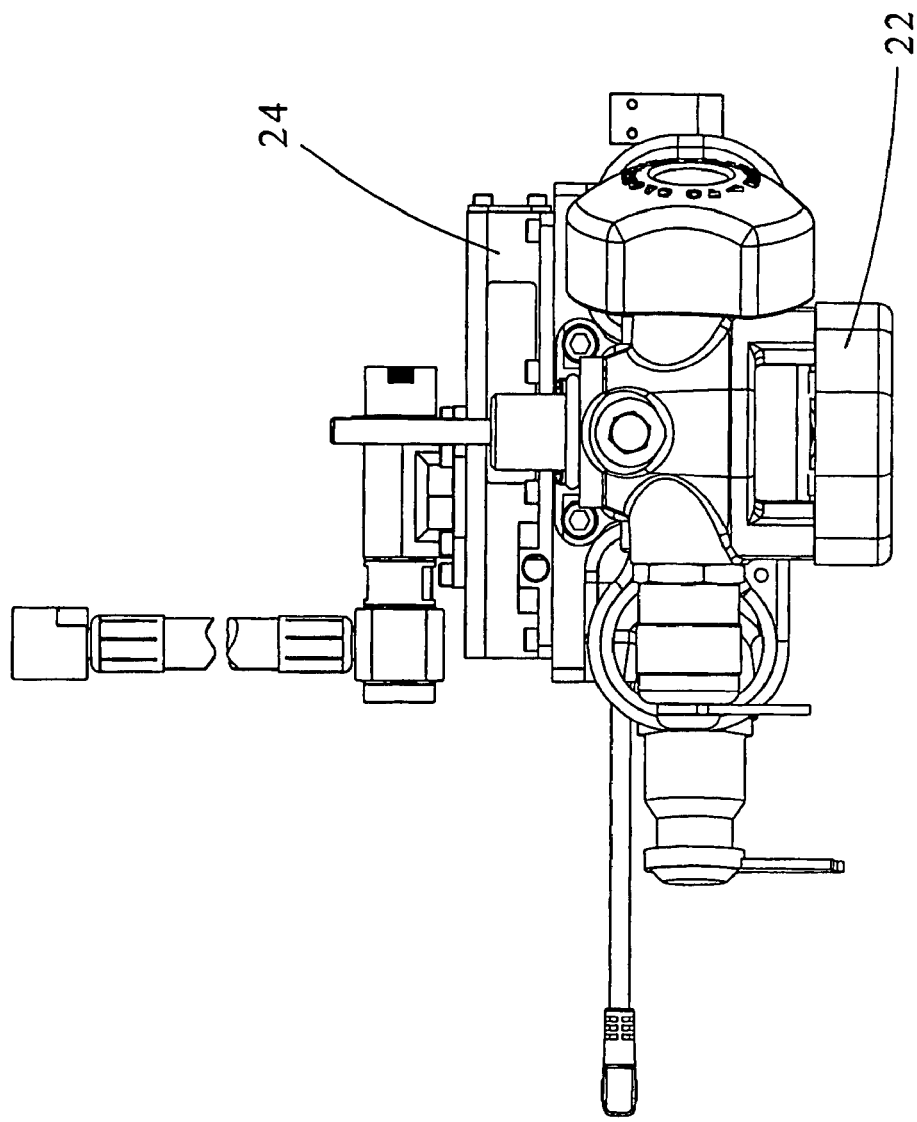
FIG. 5 is a front plan view of the quick connect valve and pressure reducer of FIG. 2.

FIG. 2 is a perspective view of the quick connect valve and pressure reducer 20 of FIG. 1, while FIGS. 3, 4 and 5 are side, top and front plan views, respectively, of the quick connect valve and pressure reducer 20 of FIG. 2. As shown therein, the quick connect valve and pressure reducer 20 includes a cylinder valve 22 and a pressure reducer 24. The cylinder valve 22 and pressure reducer 24 may be easily separated and connected via a quick connect mechanism described in greater detail below.

Figure 7:
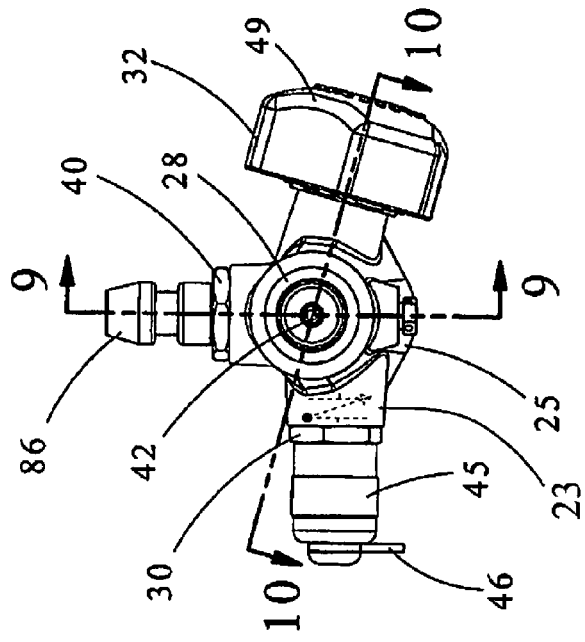
FIG. 7 is a top plan view of the cylinder valve of FIG. 6 with a protective cap attached.
Figure 6:
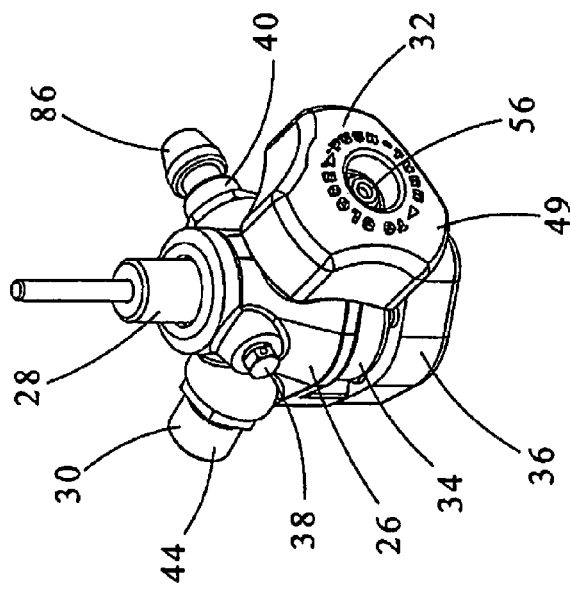
FIG. 6 is a perspective view of the cylinder valve of FIG. 2, shown in isolation.
Figures 8, 9:
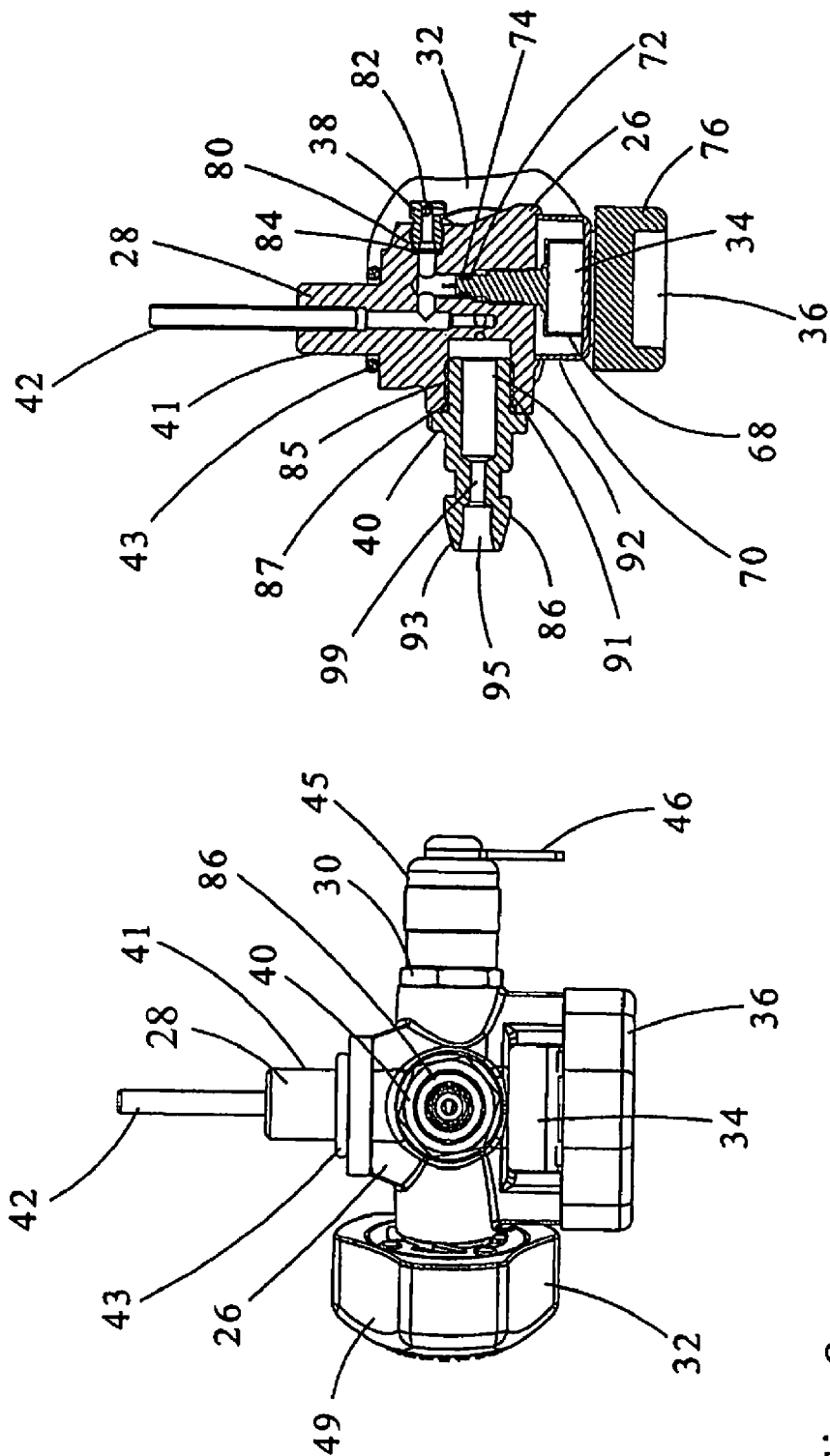
FIG. 8 is a rear plan view of the cylinder valve of FIG. 7, shown in isolation.
FIG. 9 is a left side cross-sectional view of the cylinder valve of FIG. 7, taken along line 9-9.
Figure 10:
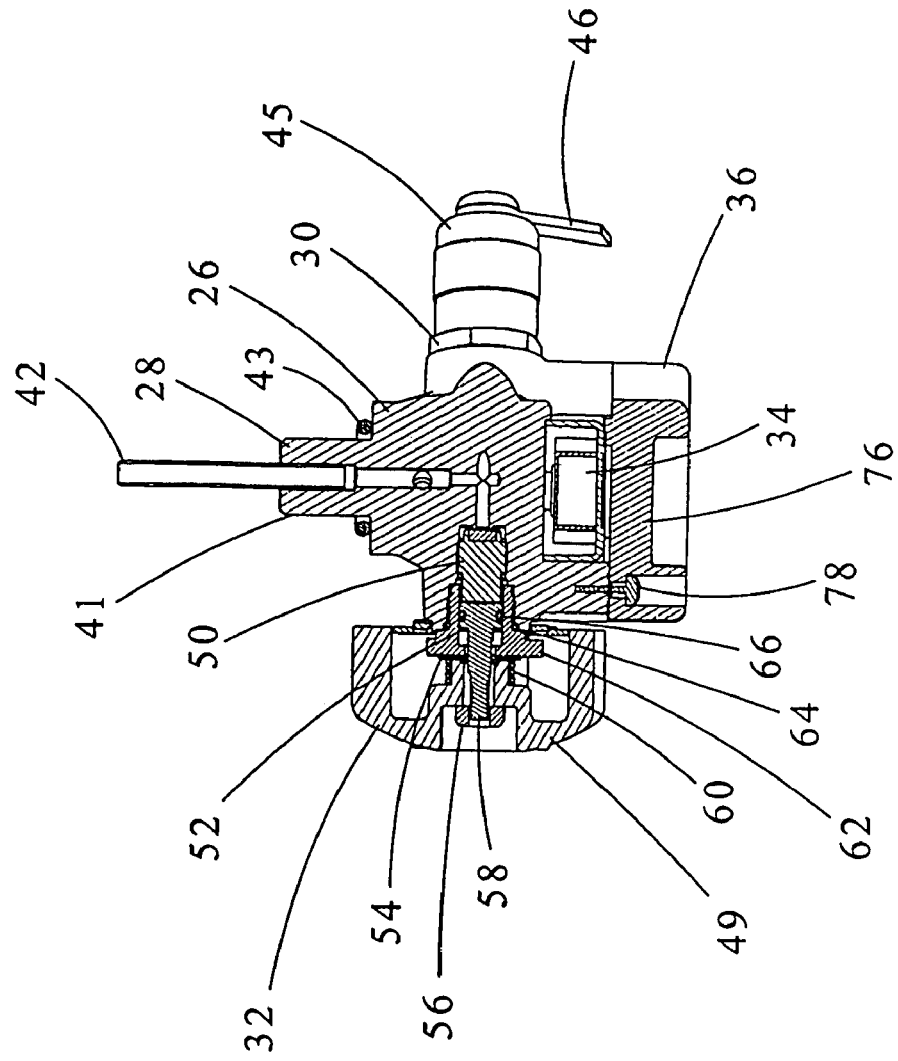
FIG. 10 is a rear cross-sectional view of the cylinder valve of FIG. 7, taken along line 10-10.

FIG. 6 is a perspective view of the cylinder valve 22 of FIG. 2, shown in isolation; FIGS. 7 and 8 are top and rear plan views, respectively, of the cylinder valve 22 of FIG. 6 with a protective cap 45 attached; and FIGS. 9 and 10 are left side and rear cross-sectional views of the cylinder valve 22 of FIG. 7, taken along lines 9-9 and 10-10, respectively. As shown therein, the cylinder valve 22 includes a valve body 26, a cylinder connection 28, a CGA assembly 30, a valve assembly 32, a pressure gauge assembly 34, a bumper guard assembly 36, a safety valve assembly 38 and a probe assembly 40. As with conventional valve bodies, the valve body 26 is integrally formed and includes a plurality of bores, as shown in FIGS. 9 and 10. The cylinder connection 28 includes a drain tube 42 disposed within, and extending from, a threaded male fitting 41, which may be integrally formed with the valve body 26. The cylinder connection 28 is preferably of a conventional design and size that may be attached to the pressure vessel or tank 12 or other standard tanks by inserting the drain tube 42 into the end of the tank 12 and screwing the male fitting 41 into a corresponding female threaded female fitting in the tank 12. A packing 43 is included around the threaded fitting 41 in order to ensure a tight seal. The threaded fitting 41, drain tube 42 and packing 43 may each be of conventional design. The cylinder connection 28, and/or any components thereof such as, but not limited to, the drain tube 42 and/or the male fitting 41, may be referred to herein as a "first fitting".

The CGA assembly 30 includes a threaded male fitting 44, best seen in FIG. 6, a protective cap 45, best seen in FIG. 7, and a check valve 23 (FIG. 7). The threaded fitting 44 is preferably a standard CGA fitting that is itself screwed into the valve body 26. The protective cap 45 may be a cover loosely connected to the valve body 26 via a tether 46. In one embodiment, the cover is formed from aluminum, and the tether 46 is formed from a rubber compound. Alternatively, however, the cover may be formed from plastic, while the tether 46 may be a metal chain. The CGA assembly 30 is preferably of conventional variety, such as that used in prior art cylinder valves 22 as the primary connection point between the valve and a conventional first stage pressure reducer. When the check valve 23 is forced open by a stem on a corresponding threaded female fitting, a direct air path is preferably created from air tank 12 through the outlet of the CGA assembly 30 for a purpose discussed hereinbelow. The CGA assembly 30, and/or any components thereof such as, but not limited to, the male fitting 44 and/or the check valve 23, may be referred to herein as a "third fitting".

As perhaps best shown in FIG. 10, the valve assembly 32, which may likewise be of conventional construction, includes a handle 49, valve plug and assembly 50, packing washer 52, wear washer 54, nylon lock nut 56, stem valve 58, spring 60, bonnet 62 and packings 64, 66. The valve plug and assembly 50 is disposed within a bore in the valve body 26 so as to control the passage of gas through the valve body 26. The stem valve 58 is arranged to extend axially through the bonnet 62, which is threaded into the valve body 26, to the handle 49, which is connected to the stem valve 58 via the lock nut 56. The spring 60, which may be a helical compression spring, is arranged to bias the handle 49 away from the bonnet 62. Notches (not shown) are disposed radially around the bottom of the handle 49 and adapted to engage tabs (not shown) extending radially from the bonnet 62 when the handle 49 is not in use. To open or close the valve 58, the handle 49 may be manually forced toward the valve body 26 in order to disengage the tabs from the notches, thus permitting the valve assembly 32 to be screwed in or out as desired. All of these components may be of conventional design and construction.

As perhaps best shown in FIG. 9, the pressure gauge assembly 34 includes a pressure gauge 68, a cover 70, a back-up ring 72 and a packing 74. The pressure gauge 68, which is marked or otherwise adapted to provide a numerical or other visual indication of the magnitude of the pressure in the tank 12, is arranged in a bore in the valve body 26 that is disposed on the upstream side of the gas path from the valve plug and assembly 50. The cover 70 is a transparent plastic shield that prevents external debris and the like from damaging the gauge 68. The bumper guard assembly 36, which includes a bumper guard 76 comprising a hard rubber cover surrounding a metal core, fastened to the valve body 26 via screws 78, protects the cover 70 and gauge 68 from external physical blows, bumps and the like. The pressure gauge assembly 34 and bumper guard assembly 36 may each be of conventional construction.

Also as shown in FIG. 9, the safety valve assembly 38 includes a burst disc 80, a safety body 82, and a safety cap washer 84, each of which may be of conventional design. The safety valve assembly 38 is arranged in a bore in the valve body 26 that is also disposed on the upstream side of the gas path from the valve plug and assembly 50. The safety valve assembly 38 provides an emergency release path should the pressure within the cylinder valve 22 exceed a predetermined threshold, as governed by the design of the burst disc 80 and the rest of the assembly 38.

Referring again to FIG. 9, the probe assembly 40 includes a threaded female fitting 85, a probe 86 and a packing 87. The female fitting 85 is preferably formed in the valve body 26 itself, and the probe 86 includes a threaded male fitting 91 at one end which is screwed into the female fitting 85 in the valve body 26. The packing 87 helps to ensure a tight seal between the probe 86 and the valve body 26, while the threaded fittings 85, 91 facilitate the easy removal of one probe 86 from the valve body 26 and replacement with a different one. Alternatively, if a permanent connection is desired, the probe 86 may be affixed in place within the valve body 26. The probe assembly 40, and/or any components thereof such as, but not limited to, the probe 86, the female fitting 85, and/or the male fitting 91, may be referred to herein as a "second fitting".

FIG. 11 is a perspective view of the probe 86 of FIG. 6, shown in isolation, and FIG. 12 is a left side plan view of the probe 86 of FIG. 11. Disposed at the end opposite the threaded male fitting 91 is a tapered probe tip 93, whose widest point defines a tip rim 94, having a cylindrical or tapered hollow 95 disposed therein. Intermediate the probe tip 93 and the male fitting 91 are a circumferential notch 96, a shaft 97 and a hexagonal flange 98. As shown in FIG. 9, a bore 92 is disposed within the threaded end and connected in fluid communication with the cylindrical hollow 95 at the opposite end by a narrow tube 99. The hexagonal flange 98 makes it possible to use a wrench or similar tool to install or uninstall the probe 86 from the valve body 26, while the purpose of the other elements of the probe 86 will become apparent hereinbelow. The probe 86 is preferably integrally formed from a single piece of metal, such as stainless steel, and more preferably overmolded with a suitable thermoplastic such as PolyEtherEther-Ketone ("PEEK").

The dimensions of the probe 86 and its various features may be varied as desired. However, changes in the dimensions or design of the probe 86 may need to be coordinated with corresponding changes in the dimensions or design of portions of the pressure reducer 24, as will become apparent below. Optionally, a set of probes 86 having different dimensions may be developed such that each differently-sized or -shaped probe 86 is intended for use only with tanks 12 of a particular capacity or pressure level. For example, a longer, narrower probe could be intended for use with a 4500 p.s.i.g.-rated tank 12, while a shorter, thicker probe 86 could be intended for use with a 2216 p.s.i.g.-rated tank 12. These dimensional changes may be coordinated by dimensional changes in particular elements of the pressure reducer 24 for a purpose more fully described hereinbelow.

Figure 13:
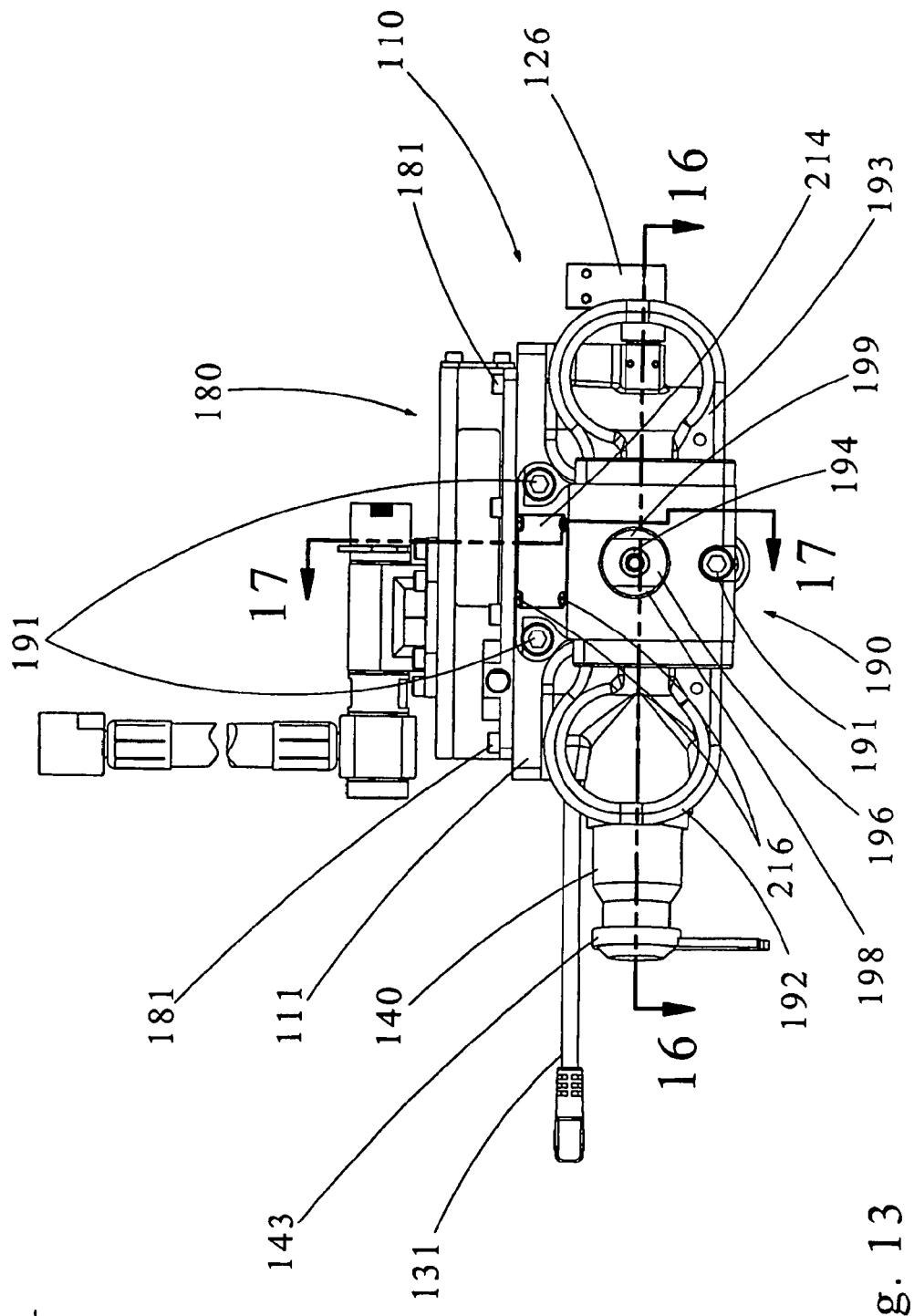
FIG. 13 is a front plan view of the pressure reducer of FIG. 2, shown in isolation.
Figure 14:
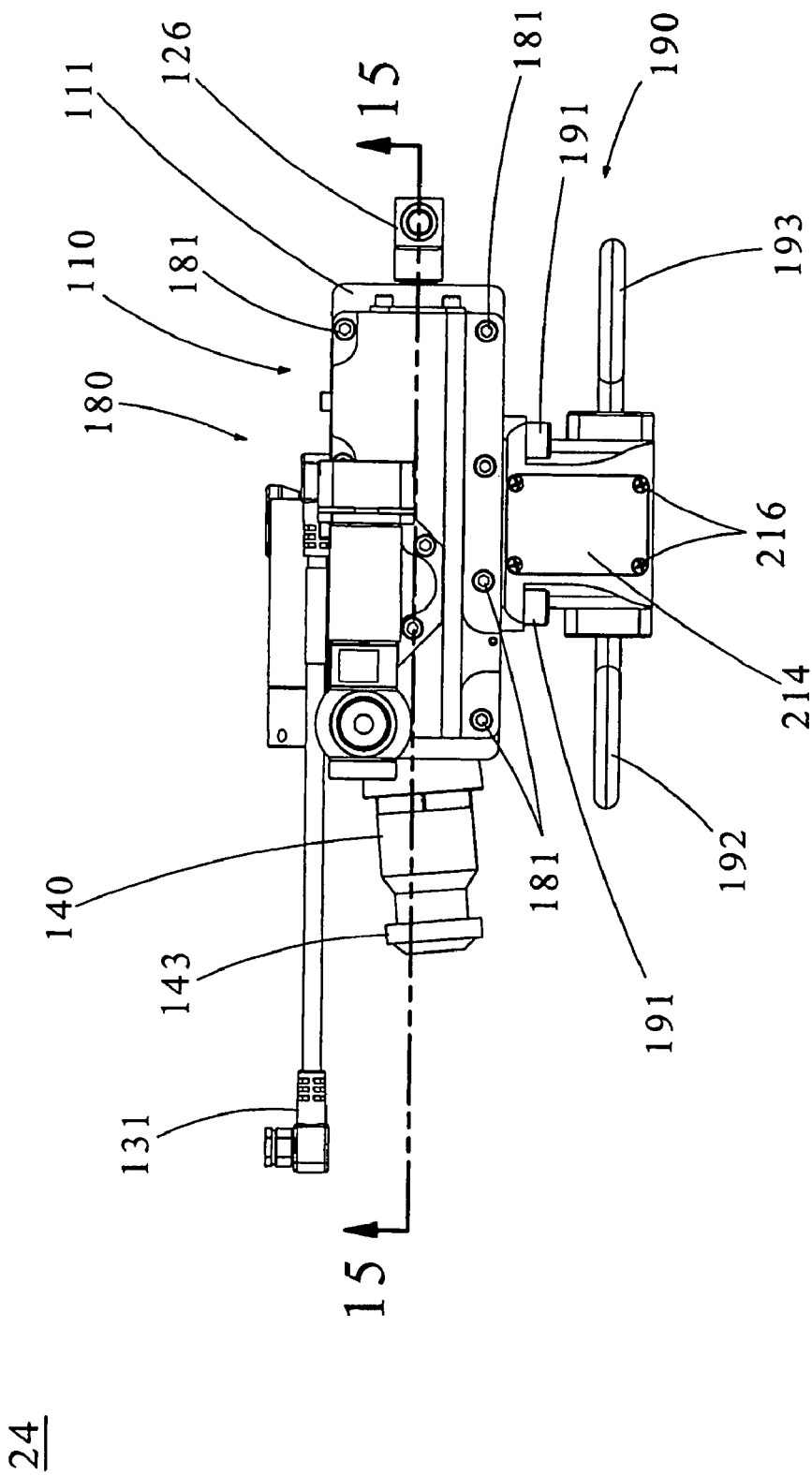
FIG. 14 is a top plan view of the pressure reducer of FIG. 13.

FIGS. 13 and 14 are front and top plan views of the pressure reducer 24 of FIG. 2, shown in isolation. The primary components of the pressure reducer 24 include a pressure reduction assembly 110, a manifold assembly 180, an inlet/latch assembly 190 and an electrical assembly 130 (best seen in FIG. 17).

Figure 15:
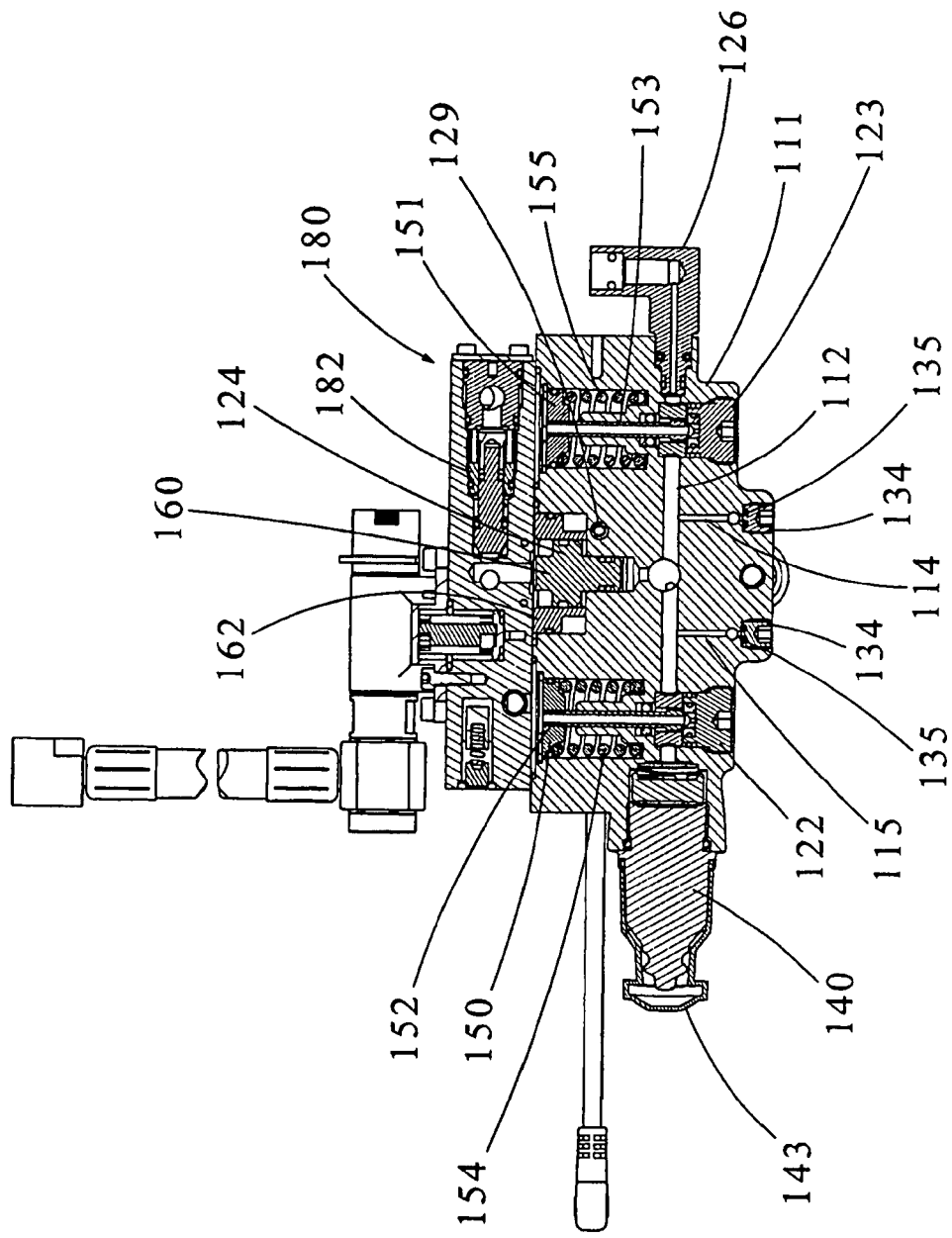
FIG. 15 is a front cross-sectional view of the pressure reducer of FIG. 13, taken along line 15-15.
Figure 16:
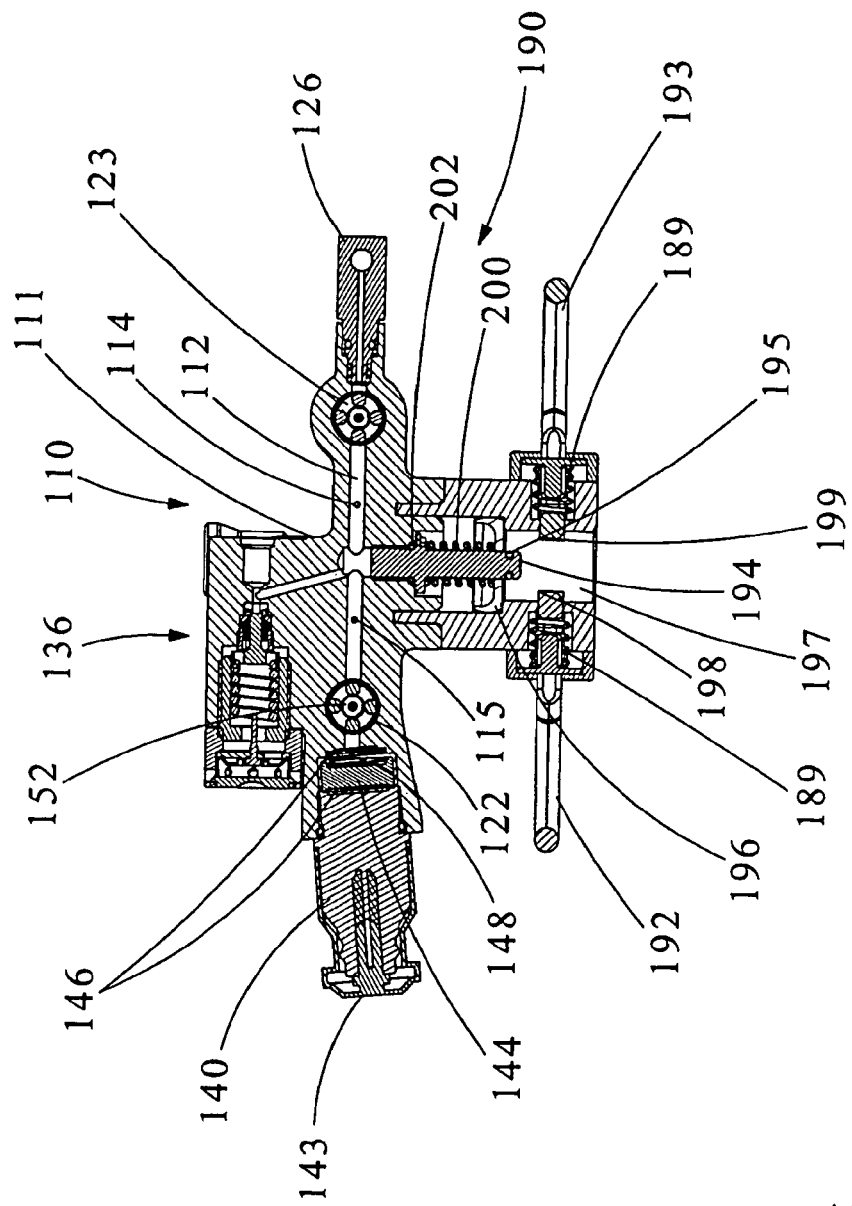
FIG. 16 is a top cross-sectional view of the pressure reducer of FIG. 13, taken along line 16-16.
Figure 17:
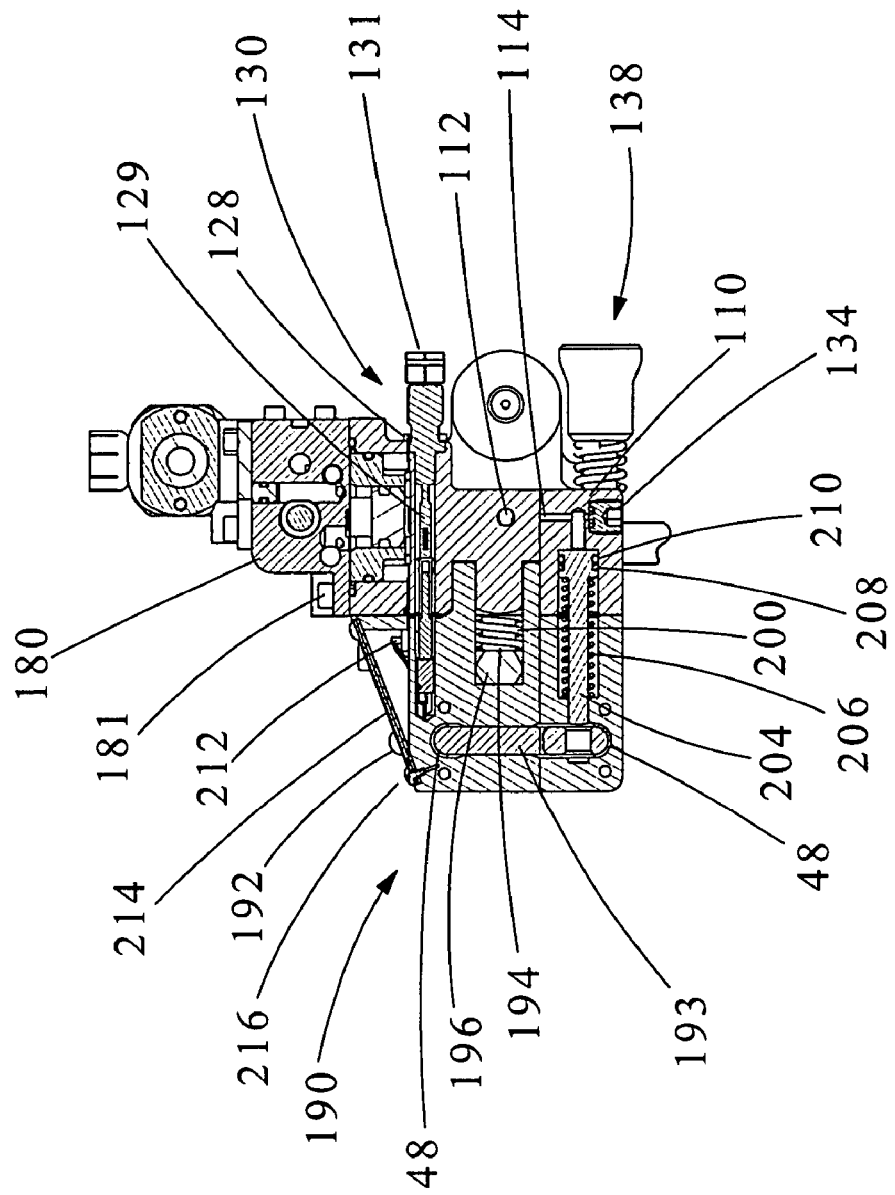
FIG. 17 is a right side cross-sectional view of the pressure reducer of FIG. 13, taken along line 17-17.

FIG. 15 is a front cross-sectional view of the pressure reducer 24 of FIG. 14, taken along line 15-15, and FIGS. 16 and 17 are top and right side cross-sectional views of the pressure reducer 24 of FIG. 13, taken along lines 16-16 and 17-17, respectively. The pressure reduction assembly 110 includes a housing 111, primary and secondary reducer modules 122, 123, a transfer valve assembly 124, a high pressure elbow assembly 126, pressure plugs 134, packings 135, a diffuser assembly 136 (best seen in FIG. 16), a positioner assembly 138 (best seen in FIG. 17) and a quick charge assembly 140. The housing 111 is preferably machined from a single block of suitable metal, such as an aluminum forging, and includes a variety of bores and other adaptations for the various components, as well as a plurality of connecting conduits 112, 114, 115 linking the components together.

Referring again to FIG. 15, the primary and secondary reducer modules 122, 123 each comprise a collection of conventional components, including a respective piston head 150, 151, a respective hollow piston shaft 152, 153 and a respective helical compression spring 154, 155. Although not shown, one or both of the reducer modules 122, 123 may be built as an independently replaceable modular unit, which may simplify manufacture and repair. In general, the assemblies 122, 123 utilize a balanced piston design in that the respective components of the two reducer modules 122, 123 are similar, except for the strengths of the respective compression springs 154, 155. Gas may be fed to the two reducer modules 122, 123 via a central supply conduit 112. The transfer valve assembly 124 likewise includes a collection of conventional components, including a valve 160 and a valve sleeve 162. Design and construction of the pressure reducer 24 may be more straightforward if the transfer valve assembly 124 is disposed intermediate the primary and secondary reducer modules 122, 123, as shown, but other arrangements will be apparent to those of ordinary skill in the art.

The quick charge assembly 140 provides an alternative means for supplying high pressure breathing gas to the central supply conduit 112 to be distributed through the pressure reducer 24 to the user. It is anticipated that such a feature would typically be used during emergency situations, where the tank 12 connected to the cylinder valve 22 is empty or malfunctioning and there is no time to replace or repair it. As perhaps best shown in FIG. 16, the quick charge assembly 140 includes a male coupling covered by a protective cap 143. The coupling 142 is oriented horizontally but at a slight forward angle relative to the primary axes of the pressure reducer 24. The quick charge assembly 140 interfaces with the central supply conduit 112 and the pressure reducer housing 111 via a check valve 144, a pair of orifice plates 146 and a seal retainer spring 148.

Referring again to FIGS. 14 and 15, the manifold assembly 180, which includes an automatic transfer valve assembly 182, is fastened to the housing 111 of the pressure reduction assembly 110 via a plurality of screws 181, which may be of a socket-head type. The manifold assembly 180 is generally of conventional design and construction, adapted to fit with the pressure reducer housing 111 and its various components.

Referring again to FIGS. 16 and 17, the inlet/latch assembly 190, which is attached to the front of the pressure reduction assembly 110 via a plurality of screws, primarily includes a probe tip receptacle 197, a pair of cylinder latches 192, 193, an inlet nozzle 194 and a pair of latch lock pins 204, all arranged in a housing. The probe tip receptacle 197 is a cylindrical opening adapted to receive the probe tip 93, while the proximate end of the inlet nozzle 194 is adapted to fit snugly within the cylindrical hollow 95 in the probe tip 93 when the probe tip 93 is inserted into the receptacle 197. When thus arranged, an air path is completed between the cylinder valve 22 and the pressure reducer 24. The snug fit of the inlet nozzle 194 within the probe tip 93 may be further enhanced by the inclusion of a packing 195 disposed near the end of the nozzle 194, thereby providing a seal between the cylindrical hollow 95 of the probe 86 and the nozzle 194, while the distal end of the nozzle 194 may be sealed to the pressure reduction assembly 110 with a packing 202 and lubricant.

The latches 192, 193 are arranged transversely within the inlet/latch assembly 190 and include respective latch shoulders 198, 199 adapted to fit within the circumferential notch 96 in the probe 86. Springs 189 are provided to bias the two latches 192, 193 toward each other. Bearings 48, preferably formed from a self-lubricating material, are provided on the latches 192, 193. In addition, as perhaps best seen schematically in FIGS. 18-21, an opening is disposed in the body of each latch 192, 193 to accommodate one of the latch lock pins 204 as next described.

The latch lock pins 204 are oriented perpendicularly relative to the latches 192, 193 and arranged to be coaxial with correspondingly-shaped and -sized openings in the latches 192, 193 when the latches 192, 193 are in their normal biased positions. However, a compression spring 206 is arranged around each latch lock pin 204 in order to bias the pins 204 away from the latches 192, 193, thereby permitting the latches 192, 193 to be moved transversely when sufficient forces are exerted thereon. The latch lock pins 204 reside in bores in the inlet/latch assembly 190 which are in fluid communication with the central supply conduit 112 via connector conduits 114, 115, thus permitting the distal ends of the latch lock pins 204 to be subjected to the same gas pressure as is supplied to the central supply conduit 112. The latch lock pins 204 are equipped with a packing 210, held in place by a packing retainer 208 and coated with a lubricant, in order to ensure a tight seal. The compression springs 206 are preferably selected and installed so as to be overcome when a relatively nominal threshold pressure, which for example may be 50 p.s.i.g., is applied to the distal ends of the pins 204. Thus, when a gas pressure of more than the threshold exists in the central supply conduit 112, the proximate ends of the pins 204 are forced into the openings in the latches 192, 193, thus preventing the latches 192, 193 from being moved. As a result, the latches 192, 193 are locked in place whenever the threshold gas pressure exists in the system, thus providing an important safety feature in the operation of the probe 86 and latches 192, 193.

The inlet/latch assembly 190 is further equipped with a spring-loaded nipple disk 196 adapted to provide an additional seal between the probe tip 93 and the inlet nozzle 194. The nipple disk 196 preferably includes an integral skirt, perhaps best seen in FIG. 16, having an arcuate cross-section for a purpose described more fully hereinbelow. A compression spring 200 is arranged axially behind the nipple disk 196 in order to bias the disk 196 toward the probe tip 93. The spring 200 also has the effect of expelling the probe tip 93 from the probe tip receptacle 197 when the latches 192, 193 are pulled apart, as described hereinbelow.

The shape and dimensions of the elements of the various elements of the inlet/latch assembly 190 are selected to correspond to the shape and dimensions of the probe 86. However, as described previously, it may be desirable to develop a set of probes 86 having different dimensions or shape such that each differently sized or shaped probe 86 is intended for use only with tanks 12 of a particular capacity or pressure level. In this case, changes in the size or shape of the probe 86 are preferably coordinated with corresponding changes in the arrangement of the inlet/latch assembly 190. The dimensional variations in both probes 86 and inlet/latch assemblies 190 for different tank capacities are preferably significant enough such that a probe 86 intended for use with one capacity level cannot be used in an inlet/latch assembly 190 that is intended for use with a different capacity level. For example, referring back to the exemplary probes 86 described previously, the long, narrow probe 86 may be too long to be latched between the latches 192, 193, while the short, thicker probe 86 may be too wide to fit in the probe tip receptacle 197. Such a feature prevents a tank 12 of the wrong capacity from being used accidentally. This may prevent damage to the pressure reducer 24 or injury to a user, and may further prevent a user from believing that the tank 12 being utilized in his SCBA 10 has a higher capacity than it does.

Although perhaps less desirable because of the increased connection time involved, it will be apparent that the use of probes of different dimensions, corresponding to different pressure vessel capacities, may also be applied to other types of probe connectors. For example, instead of a circumferential notch retained between two spring-loaded latches, a probe (not shown) could utilize a more conventional threaded male CGA fitting from which extends a probe tip similar to those described herein, and a probe tip receptacle could be provided with a corresponding threaded female CGA fitting. Probe tips of different lengths could then be configured to extend a greater or lesser depth into the probe tip receptacle, depending on the placement of the threaded fitting relative to the probe tip. Such a configuration would permit the use of the "universal pressure reducer" concept described herein, but would make it more difficult to connect or disconnect the probe from the inlet/latch assembly.

Referring to FIG. 17, the electrical assembly 130 includes an electrical switch 212, a switch wire 129, a retainer 128 and a cable connector assembly 131. The electrical switch 212, which is preferably a normally-off switch actuated via a small spring-loaded button located on the bottom thereof, is disposed within a recess in the inlet/latch assembly 190 such that the button on the switch 212 protrudes downward through a small aperture into the cavity in which the inlet nozzle 194, nipple disk 196 and spring 200 are disposed. The switch 212 itself is protected from the external environment by a switch cover 214, whose underside is covered with rubber, arranged to cover the recess and attached via a plurality of screws 216. The switch wire is electrically connected from the switch 212, which is grounded to the inlet/latch assembly 190, through the pressure reduction assembly 110 to the cable connector assembly 131 and from there to the SCBA electronics system. The cable connector assembly 131 is secured to the pressure reduction assembly 110 via the retainer 128 and a screw (not shown) and sealed with a sealing compound.

The button on the switch 212 is positioned relative to the cavity containing the nipple disk 196 such it lies at the periphery of the path of motion taken by the nipple disk 196 as it moves back and forth along the inlet nozzle 194. Thus, when the nipple disk 196 is forced rearward by the probe tip 93, the skirt of the disk 196 makes contact with the button on the switch 212, thereby depressing the button and actuating the switch 212. Preferably, the switch 212 and nipple disk 196 are arranged such that when the probe tip 93 is fully inserted in the probe tip receptacle 197, the nipple disk 196 remains in contact with the button on the switch 212, thus keeping the switch 212 actuated. A signal indicating that the probe tip 93 is engaged in the inlet/latch assembly 190 is thus transmitted along the switch wire 129, the cable connector assembly 131 and a corresponding cable (not shown) to the SCBA electronics system. When the probe tip 93 is removed from the receptacle 197, the spring 200 forces the disk 196 back forward, releasing the switch button and deactuating the switch 212.

To use the quick connect valve and pressure reducer 20, the cylinder valve 22 is first installed on a breathing air tank 12 by threading the male fitting 41 into a corresponding female fitting on the tank 12 and charging (pressurizing) the tank 12. For convenience, a plurality of loaded tanks 12 may be stored with cylinder valves 22, each with an appropriately-sized probe 86, already installed. When a tank 12 is needed, the assembled tank 12 and cylinder valve 22 may be positioned such that the probe 86 is aligned with the probe tip receptacle 197, and then the probe tip 93 may be inserted therein. As the probe tip 93 encounters the latch shoulders 198, 199, the latches 192, 193 tend to be forced outward, thereby permitting the probe tip rim 94 to pass between the latch shoulders 198, 199. Additional resistance is encountered when the probe tip 93 encounters the nipple disk 196, which is biased by the compression spring 200. When force sufficient to overcome the spring 200 is applied to the probe 86, the probe tip 93 may move deeper into the inlet/latch assembly 190 until the tip rim 94 passes the latch shoulders 198, 199, thereby permitting the shoulders 198, 199 to snap into place in the circumferential notch 96. The latches 192, 193 are held in place in that position by the force of the latch springs 189, thus capturing and retaining the probe 86 within the probe tip receptacle 197.

As long as the probe tip 86 is retained in the probe tip receptacle 197 as described above, the nipple disk 196 is maintained in continuous contact with the activation button on the switch 212 of the electrical assembly 130, thereby activating it. The switch 212 thus provides the SCBA electronics system with an electrical indication that a probe 86, and implicitly an assembled air tank 12 and cylinder valve 22, are installed in the pressure reducer 24. The SCBA electronics system, whether it may be a simple audible alarm generator or a more complex electronic device, may then operate accordingly.

Once the pressure reducer 24 has been connected to the cylinder valve 22, the entire assembly is ready for operation. The tank 12, quick connect valve and pressure reducer 20 and other equipment are loaded on the user's back using a backpack, harness and the like, and the facepiece 16 is placed over the user's face such that it covers the user's mouth, nose or both, in conventional fashion. The hose assembly 18 is arranged to extend comfortably between the pressure reducer 24 and the facepiece 16, without interfering with the user's natural movements. The cylinder valve 58 may be opened by manually turning the handle 49 of the valve assembly 32 as described above, thereby permitting breathing gas to flow through the cylinder valve 22 and into the inlet nozzle 194 of the pressure reducer 24.

Figure 18:
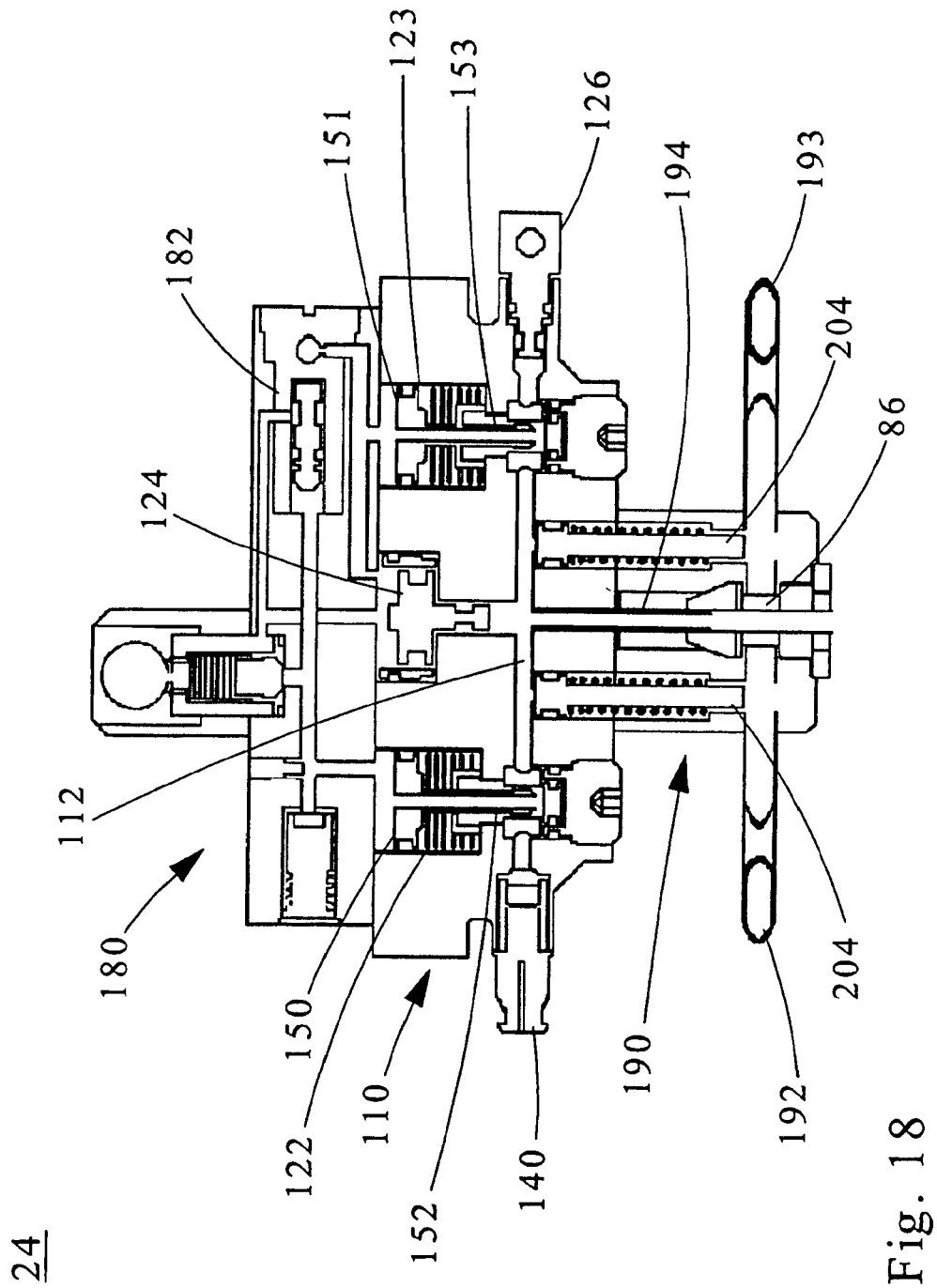
FIG. 18 is a front schematic view of the pressure reducer of FIG. 13, showing the state of the pressure reducer at initial activation.
Figure 19:
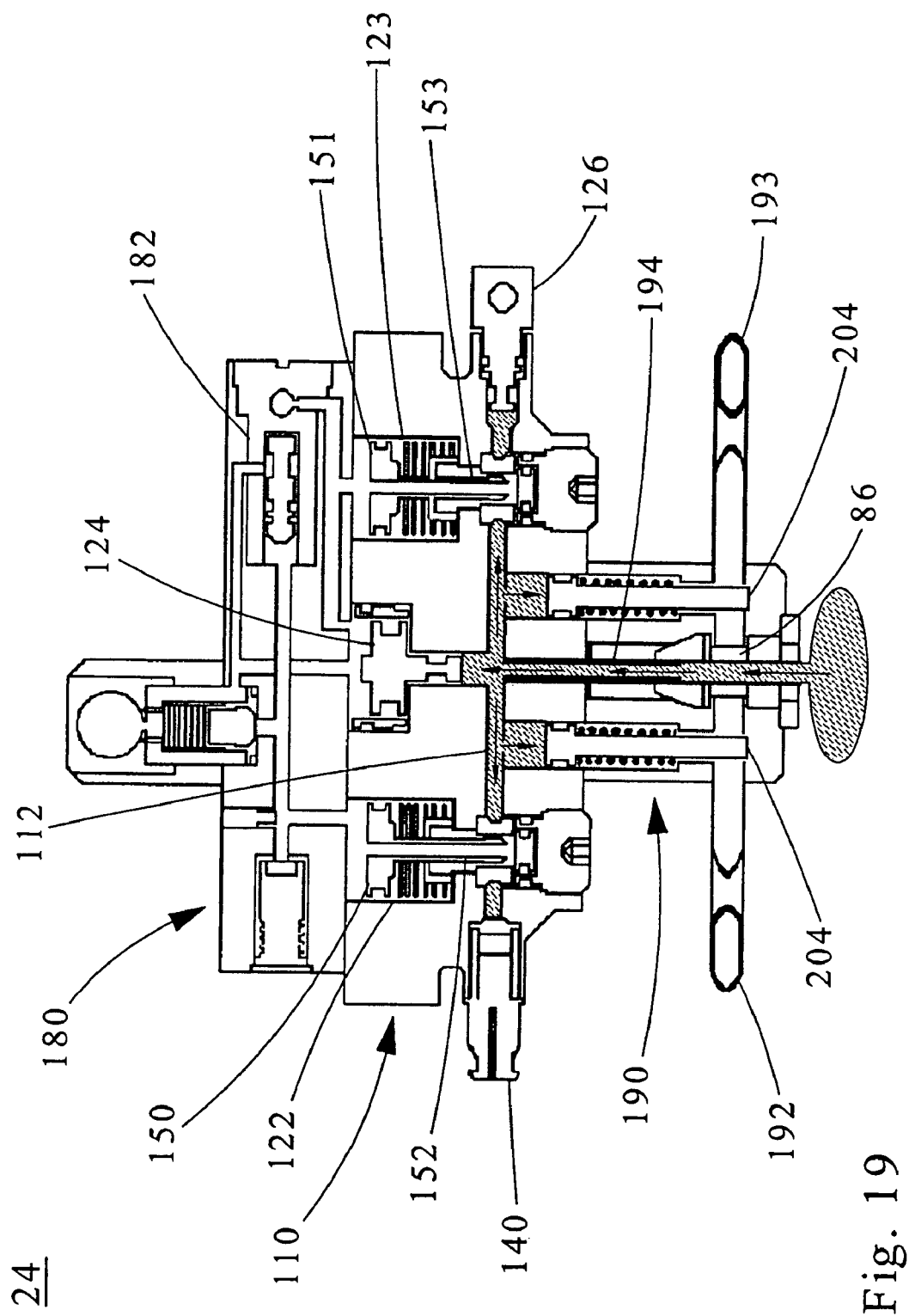
FIG. 19 is a front schematic view of the pressure reducer of FIG. 13, showing the latch pins being forced into openings in the latches.

Breathing gas passes through the pressure reducer 24 as follows. FIG. 18 is a front schematic view of the pressure reducer 24 of FIG. 13, showing the state of the pressure reducer 24 at initial activation. From the inlet nozzle 194 the breathing gas enters the central supply conduit 112 where it may be distributed to the primary and secondary reducer modules 122, 123. At the same time, high pressure breathing gas travels through the latch pin connector conduits 114, 115 to act on the ends of the latch lock pins 204. The force thus applied is sufficient to overcome the bias applied in the opposite direction by respective springs 206, thereby forcing the opposite ends of the pins 204 into respective openings in the latches 192, 193. FIG. 19 is a front schematic view of the pressure reducer 24 of FIG. 13, showing the latch pins 204 being forced into openings in the latches 192, 193. The latches 192, 193 are thus locked in place whenever fluid pressure sufficient to overcome the latch pin springs 206 exists in the central supply conduit 112, thereby preventing the probe 86 from becoming accidentally disengaged from the inlet/latch assembly 190 while high-pressure gas is flowing therethrough. The latch lock pins 204 and springs 206 are preferably calibrated such that any pressure above approximately 50 p.s.i.g. is sufficient to hold the latch lock pins 204 in place in the latches 192, 193.

Figure 20:
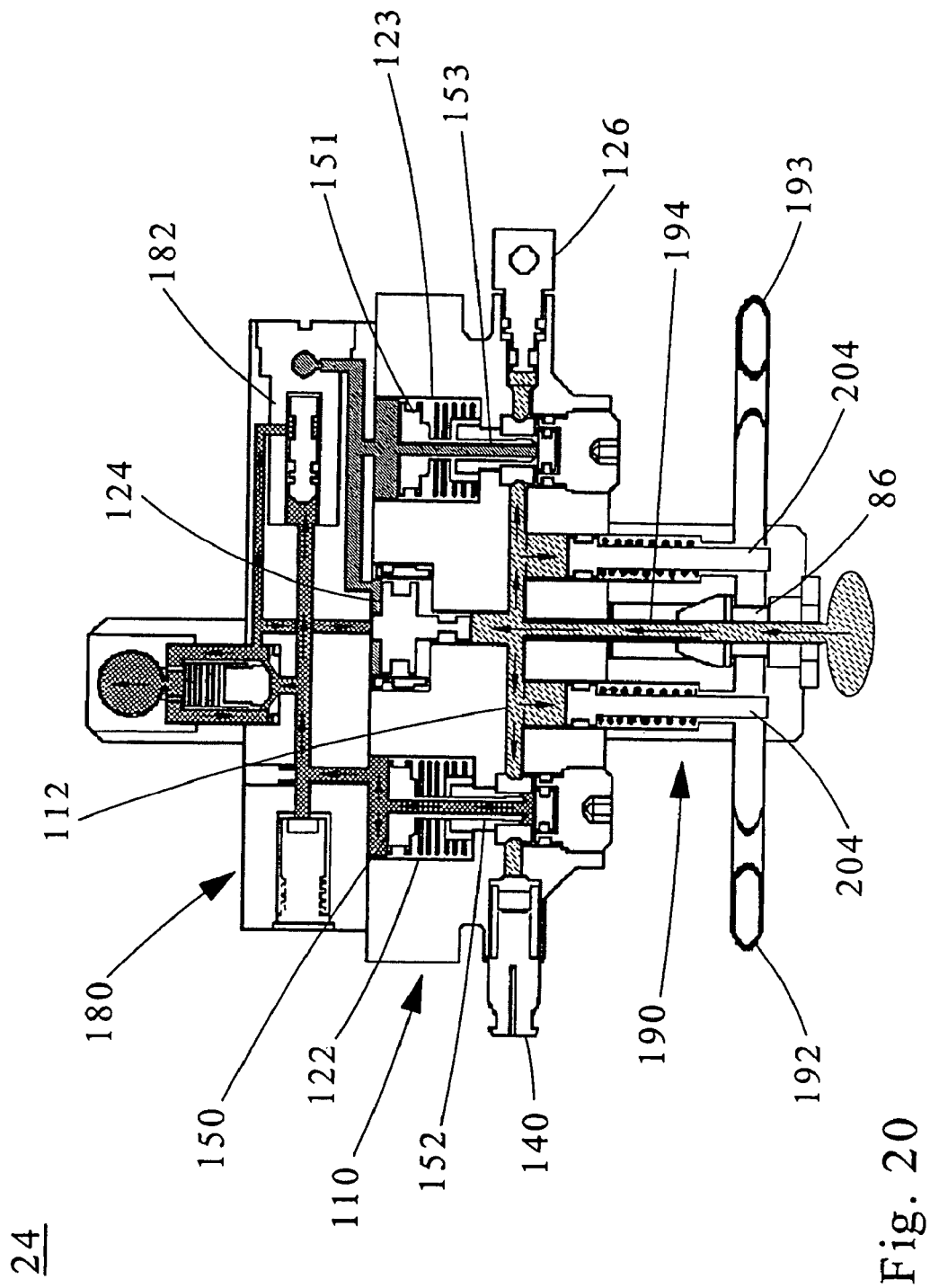
FIG. 20 is a front schematic view of the pressure reducer of FIG. 13, illustrating normal high pressure operation of the pressure reducer.

Further operation of the pressure reducer 24 may proceed according to conventional principles. FIG. 20 is a front schematic view of the pressure reducer 24 of FIG. 13, illustrating normal high pressure operation of the pressure reducer 24. Breathing air flows through the primary reducer module 122, which delivers a constant outlet pressure of nominal 100 p.s.i.g., at which pressure the breathing gas is subsequently communicated to the second stage regulator 14 for further pressure reduction. At the high pressures initially provided by the air tank 12, the pressure in the central supply conduit 112 is very high relative to the lower pressure on the outlet side of the primary reducer module 122, and even though the lower pressure is applied to a larger surface area of the transfer valve 160 than the area to which the high pressure is applied, the transfer valve 160 normally closes during high pressure operation. Breathing gas is thus supplied to the second stage regulator 14 via the primary reducer module 122, which opens and closes during inhalation and exhalation, respectively. The user may thus breathe normally via the SCBA 10 as he carries out his normal duties in the air-poor environments in which his work or other activities may take him.

Figure 21:
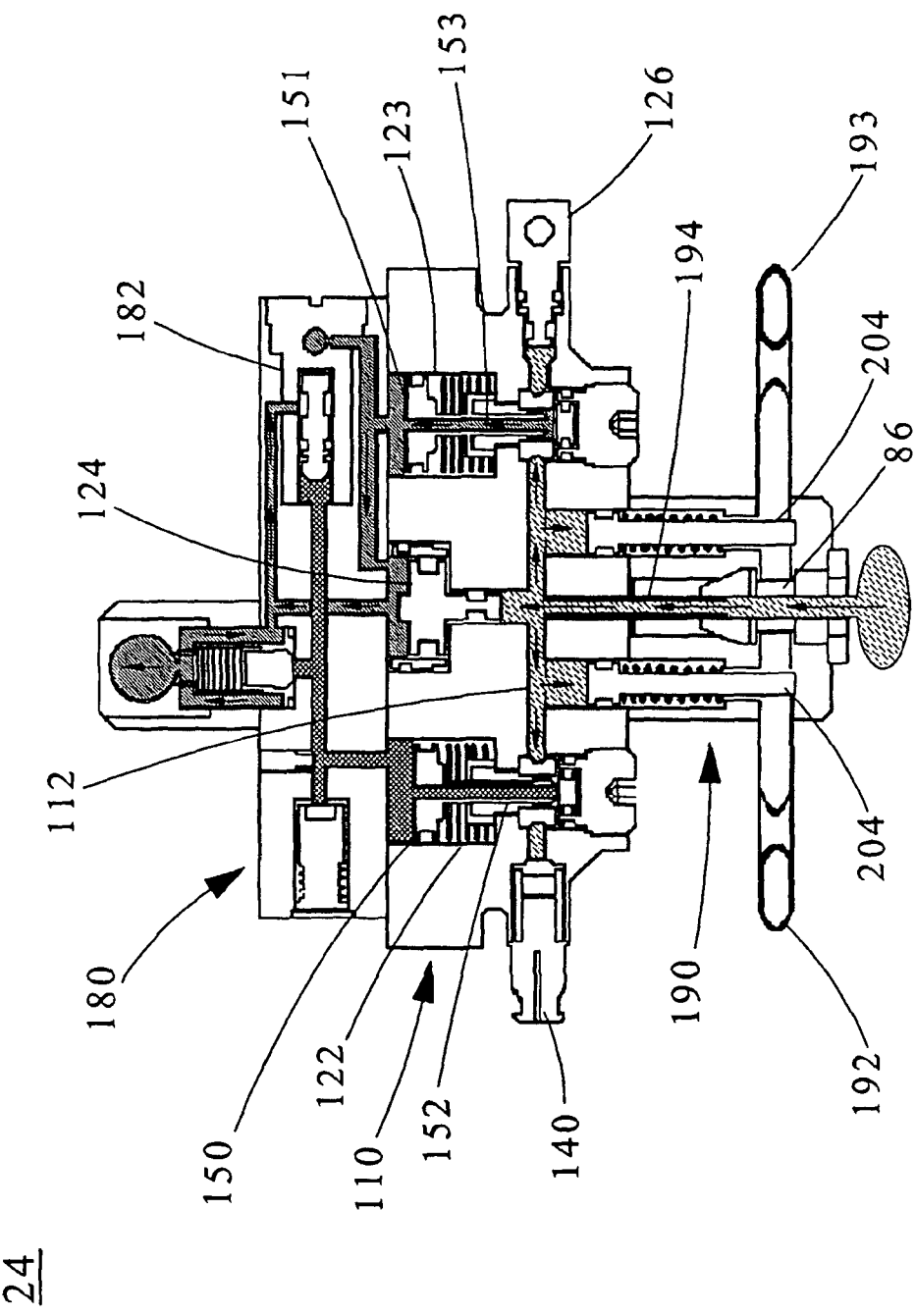
FIG. 21 is a front schematic view of the pressure reducer of FIG. 13, illustrating normal low pressure operation of the pressure reducer.

FIG. 21 is a front schematic view of the pressure reducer 24 of FIG. 13, illustrating normal low pressure operation of the pressure reducer 24. As more air is drawn out of the air tank 12, the pressure of the breathing air passing into the pressure reducer 24 diminishes. However, the pressure at the outlet of the primary reducer module 122 remains constant. Thus, because the surface area of the transfer valve 160 to which the low pressure breathing air is applied is much larger than that to which the diminished high pressure breathing air is applied, the transfer valve 160 is eventually forced open. From this point on, the pressure differentials keep the primary reducer module 122 closed, while breathing air flows through the secondary reducer module 123 at a constant outlet pressure. The breathing gas is subsequently communicated to the second stage regulator 14 at this constant outlet pressure, which may be greater than the constant outlet pressure provided by the primary reducer module 122, as the secondary reducer module 123 opens and closes during inhalation and exhalation, respectively.

It is extremely desirable, and is in fact required by NIOSH and NFPA standards, for an alarm to be generated once pressure in the tank 12 drops below a predetermined level, which is preferably ¼ of the maximum capacity. This alarm may use the audible alarm generator described previously, or may be a separate alarm. Use of the transfer valve 160 to trigger such an alarm may be easily accomplished by designing the various components of the pressure reducer 24, and particularly the transfer valve assembly 124, such that the transfer valve 160 opens at the desired pressure level. This may be accomplished using a conventional balanced piston with cylinder pressure on one side and reducer pressure on the other. When pressure in the tank 12 depletes to ¼ capacity, the transfer valve 160 shifts allowing secondary reducer pressure to flow to an alarm mechanism.

The SCBA 10 may be used as described above until either the tank 12 is empty (or at least empty enough that the pressure in the system drops below the predetermined nominal pressure) or until the cylinder valve 22 is closed by turning the handle 49 as described above, thereby shutting off the flow of air from the tank 12. Once the pressure in the central supply conduit 112 drops below the threshold level described above, the compression springs 206 on the latch lock pins 204 force the pins 204 away from the openings in the latches 192, 193, thereby unlocking them. The probe 86 may then be removed from the probe tip receptacle 197 by grasping the latches 192, 193 and pulling them apart with sufficient force to overcome the latch springs 189, thereby releasing the probe 86 from the latch shoulders 198, 199. Upon its release from the latches 192, 193, the probe 86 is then ejected by the force of the compression spring 200 acting on the nipple disk 196. Once the probe 86 has been withdrawn from the pressure reducer 24, the cylinder valve 22 and tank 12 may, if desired, be replaced by a full tank 12 and valve 22 so as to permit the user to continue working with a fresh supply of air, or the components may be cleaned, stored, repaired or the like.

Alternatively, the tank 12 may be recharged without removing the probe 86 from the pressure reducer 24. This may be accomplished via the CGA assembly 30 by simply connecting a supply line having a corresponding female CGA fitting to the CGA assembly. The check valve opens, and air may be forced directly into the tank 12 with the valve assembly 32 in its closed position. Alternatively, if the valve assembly 32 is adjusted to its open position, pressurized air may be forced directly through the probe 86 into the pressure reducer 24.

Figure 22:
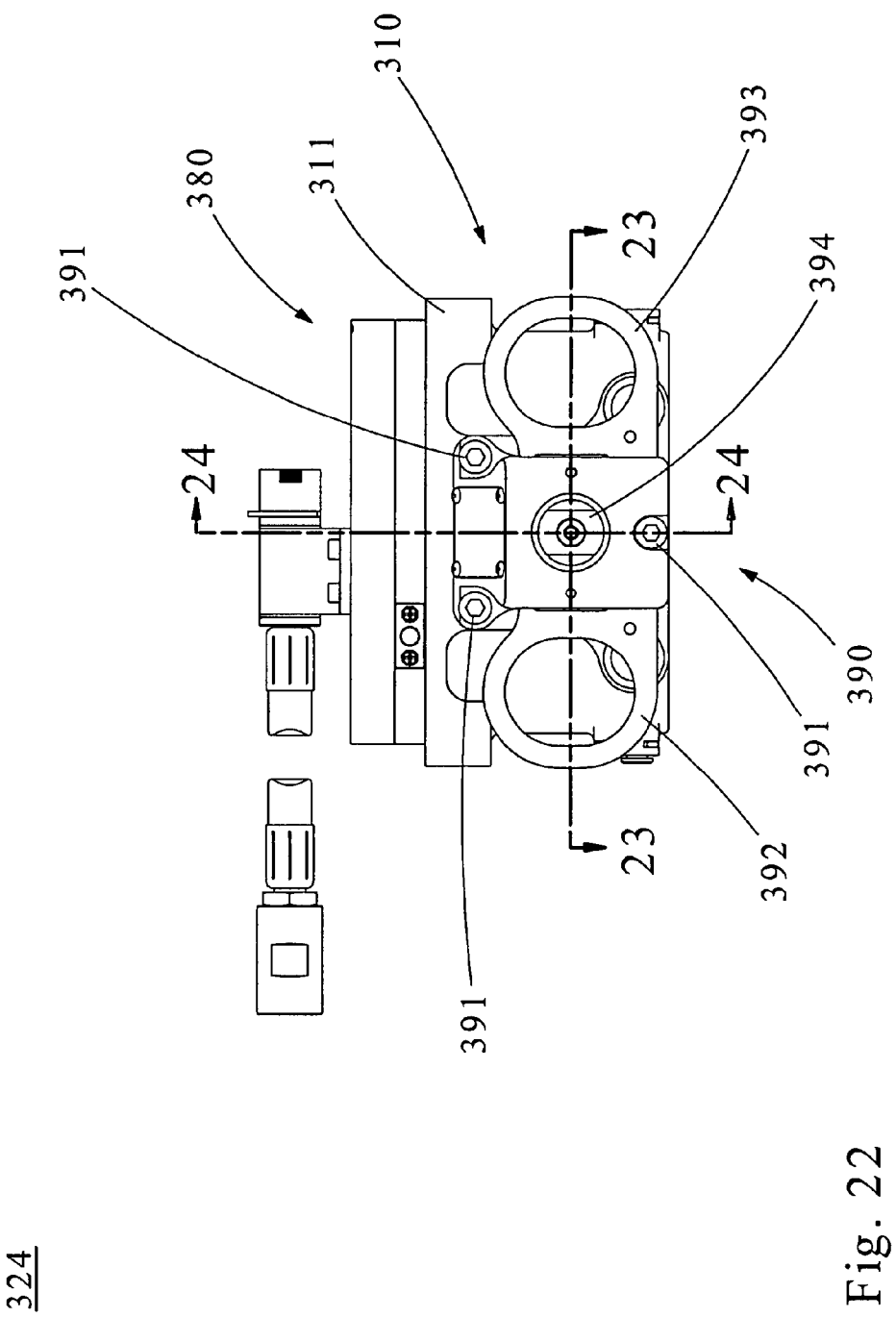
FIG. 22 is a front view of an alternative pressure reducer.
Figure 23:
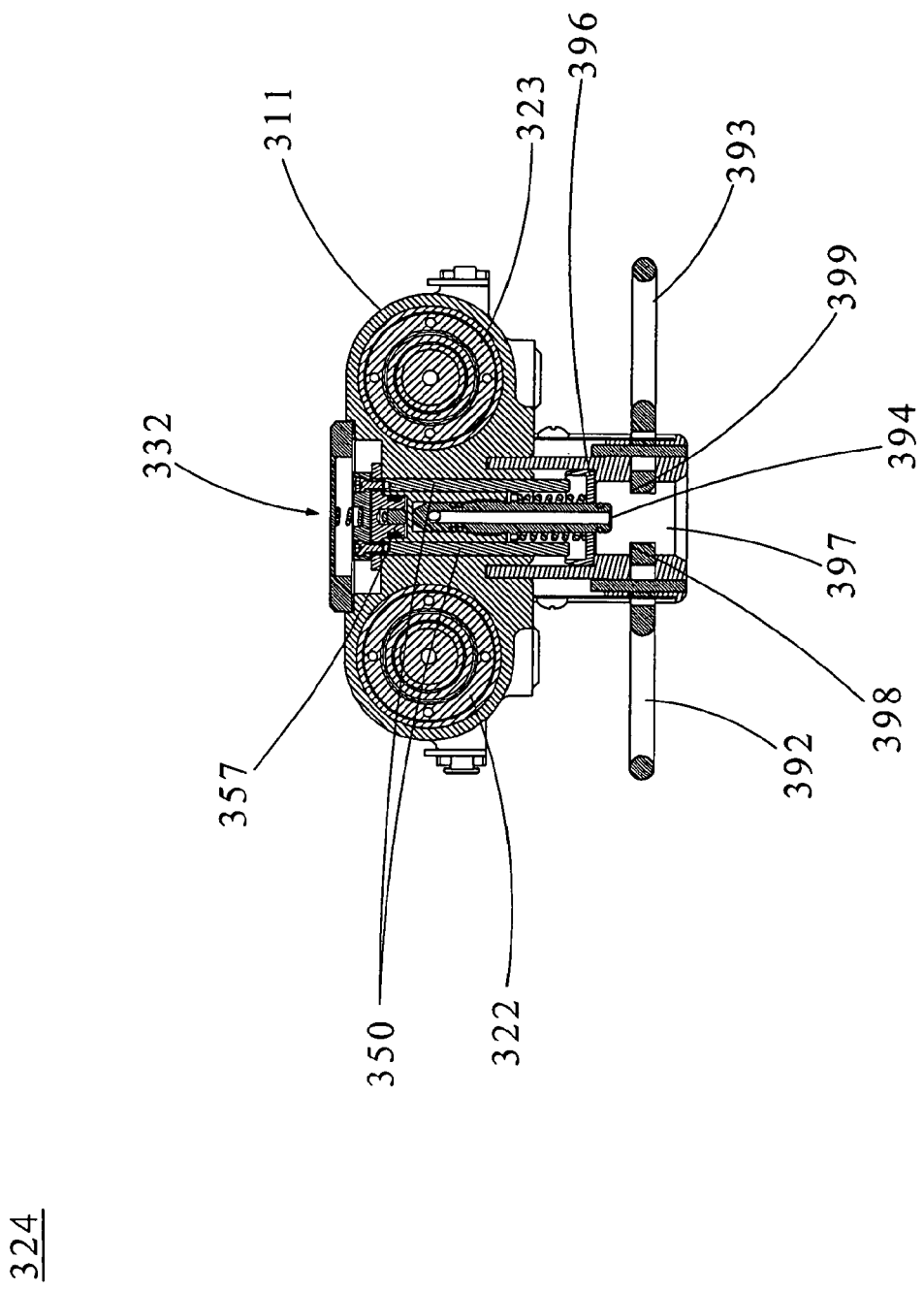
FIG. 23 is a top cross-sectional view of the pressure reducer of FIG. 22, taken along line 23-23.
Figure 24:
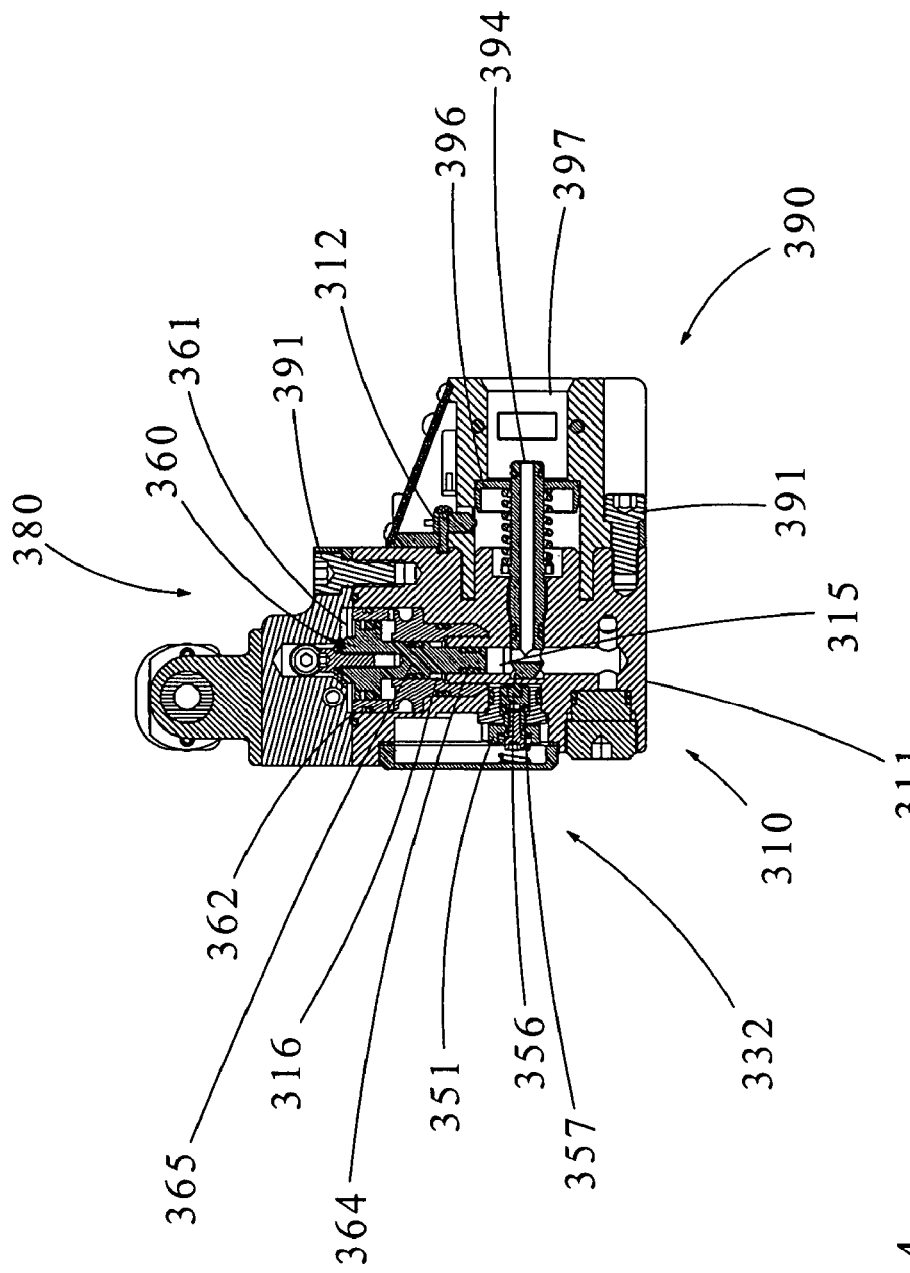
FIG. 24 is a left side cross-sectional view of the pressure reducer of FIG. 22, taken along line 24-24.

FIG. 22 is a front view of an alternative pressure reducer 324, and FIGS. 23 and 24 are top and left side cross-sectional views of the pressure reducer 324 of FIG. 22, taken along lines 23-23 and 24-24, respectively. The primary components of the pressure reducer 324 include the pressure reduction assembly 310, a manifold assembly 380, an inlet/latch assembly 390 and an electrical assembly (not shown). This pressure reducer 324 is modified to accept probes 86 of different dimensions, representative of pressure vessels 12 of different capacities, and to automatically set a low-pressure alarm based on the capacity. The pressure reduction assembly 310 includes a housing 311, primary and secondary reducer modules 322, 323 (shown in FIG. 23), a transfer valve assembly 361 (shown in FIG. 24) and a selector valve assembly 332. The function of the reducer modules 322, 323 is similar to the previously-described primary and secondary reducer modules 122, 123 in that they are a balanced piston design. In addition, as shown, the reducer modules 322, 323 are built as independently replaceable modular units, which may be preferred for ease of manufacture and repair; however, this is not required.

The transfer valve assembly 361 includes a collection of conventional components, including a valve 360 and a valve sleeve 362. As described below, the size and pressurization of the transfer valve assembly 361 determines when a predetermined alarm will sound to alert the wearer that only ¼ of the original capacity of the pressure vessel 12 remains. The valve 360 includes two sections or stages 364, 365, wherein the second valve stage 365 has a larger cross-section than that of the first valve stage 364 for a purpose made evident below.

The manifold assembly 380, which is generally similar in design and function to the previously described manifold assembly 180, is attached to the pressure reduction assembly 310 with a plurality of screws 391. The inlet/latch assembly 390, which may be attached to the front of the pressure reduction assembly 310 via a plurality of screws 391, primarily includes a probe tip receptacle 397, a pair of latches 392, 393, an inlet nozzle 394 and a nipple disk 396. Each latch 392, 393 has a respective latch shoulder 398, 399. The function and design of inlet/latch assembly 390 is likewise generally similar to that of inlet/latch assembly 190.

Referring to FIG. 24, the selector valve assembly 332 includes two pushrods 350, a selector valve plate 351, a selector valve 357 and a selector valve poppet 356. When the nipple disk 396 is displaced by a probe 86 that is designed specifically for a 2216 p.s.i.g. pressure vessel, the skirt of the disk 396 makes contact with the button on a switch 312, thereby depressing the button and actuating the switch 312, as described with regard to the first pressure reducer 24. When contact is made, a signal is sent from the switch 312 to the electronic system indicating that a probe 86 of a first set of predetermined dimensions (designated, for example, for specific use with a 2216 p.s.i.g. pressure vessel 12) has been inserted. In addition, however, the disk 396 contacts and displaces the pushrods 350, which in turn moves the selector valve plate 351. This allows the selector valve 357 and selector valve poppet 356 to unseat, thus pressurizing both a first main conduit 315 and a second, wider conduit 316. As a result, air pressure is supplied to both sections or stages 364, 365 of the transfer valve 360 via both conduits 315, 316, and the transfer valve 360 does not shift until pressure in the tank 12 drops to ¼ of the 2216 p.s.i.g. capacity. Once this shift occurs, secondary reducer pressure is allowed to flow to the alarm mechanism mentioned previously.

On the other hand, when a probe 86 of a second set of predetermined dimensions (designated, for example, for specific use with a 4500 p.s.i.g. pressure vessel 12) has been inserted, it also contacts and displaces the nipple disk 396, as described previously, but the displacement is not as great as with the probe 86 of the first dimensions. As a result, the disk 396 does not make contact with the switch 312 or the pushrods 350. Because the pushrods 350 do not move, the selector valve assembly 332 remains seated. Thus, the second conduit 316 is vented to atmosphere, and only the first conduit 315 and one stage 364 of the transfer valve 360 are pressurized. Therefore, pressure is only supplied to the first transfer valve section 364, which shifts once pressure in the tank 12 drops to ¼ of the 4500 p.s.i.g. capacity, which in turn allows secondary reducer pressure to flow to the alarm mechanism mentioned previously. In other words, the selector valve assembly 332 ensures that the pressure reducer 324 automatically recognizes the tank capacity and causes the proper stage or stages of the transfer valve 360 to shift, thus triggering the alarm mechanism, at ¼ of the tank capacity regardless of whether the capacity is 2216 p.s.i.g. or 4500 p.s.i.g.

In addition, because the disk 396 does not make contact with the switch 312, no signal is sent to the electronics system. The absence of a signal thus indicates to the electronic system that a probe 86 corresponding to a 4500 p.s.i.g. pressure vessel 12 has been inserted. Of course, the pressure levels may be varied, and the active signal may be used to represent a higher capacity and the absence of a signal the lower capacity. However, if it is desired that an active signal (rather than the absence of a signal) is always used to indicate the capacity level of the pressure vessel 12, it will be apparent to those of ordinary skill in the art that a second switch may be included, or the switch 312 may be replaced with a more complicated switch, in order to trigger such a signal. It will also be apparent that such a scheme may be further expanded to include more than two different pressure capacities, such as a 2216 p.s.i.g. capacity, a 3000 p.s.i.g. capacity, and a 4500 p.s.i.g. capacity. Finally, it will be apparent that the switch 312 may also be used to electronically trigger operation of the transfer valve assembly 361 through the inclusion of a small motor (not shown) or the like. Such an approach may either be used to assist pneumatic control of the transfer valve assembly 361 directly, or may be used to control operation of the selector valve assembly 332, thereby controlling the transfer valve assembly 361 indirectly. The mechanical approach, however, is preferred because of its ruggedness and simplicity of operation and service.

Based on the foregoing information, it is readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

What is claimed is:

1. A breathing air tank and valve assembly for use in a self-contained breathing apparatus, comprising:
    a pressure vessel; and
    a cylinder valve for connection to the pressure vessel, the cylinder valve including:
        a valve body having an interior;
        a first fitting adapted to connect the valve body directly to the pressure vessel, thereby creating a fluid connection to the interior of the valve body;
        a second fitting, the second fitting being an outlet adapted to connect the valve body to a pressure reducer assembly; and
        a third fitting, the third fitting being an inlet having a check valve, wherein the third fitting is adapted to connect the valve body to an external source of pressurized air and thereby provide a direct air path from the external source of pressurized air through the interior of the valve body to the pressure vessel.

2. The breathing air tank and valve assembly of claim 1, wherein the second fitting is a quick-connect probe for threadless connection to the pressure reducer assembly.

3. The breathing air tank and valve assembly of claim 1, wherein the third fitting includes a conventional threaded fitting for connection to the external pressurized air source.

4. The breathing air tank and valve assembly of claim 1, wherein the third fitting is a CGA-type fitting.

5. The breathing air tank and valve assembly of claim 1, wherein the cylinder valve is adjustable between at least an open state and a closed state, wherein in the open state, an air path exists from the pressure vessel through the interior of the valve body to the second fitting, and in the closed state, no air path exists from the pressure vessel through the interior of the valve body to the second fitting, wherein the direct air path from the external pressurized air source through the interior of the valve body to the pressure vessel exists regardless of whether the cylinder valve is in the open state or the closed state.

6. The breathing air tank and valve assembly of claim 1, wherein the cylinder valve is adjustable between at least an open state and a closed state, wherein in the open state, an air path exists from the pressure vessel through the interior of the valve body to the second fitting, and in the closed state, no air path exists from the pressure vessel through the interior of the valve body to the second fitting, wherein the valve assembly includes a hand wheel for adjusting the cylinder valve between the open state and the closed state.

7. The breathing air tank and valve assembly of claim 2, wherein the quick-connect probe includes a probe tip and a notch interposed between the probe tip and the valve body.

8. The breathing air tank and valve assembly of claim 7, wherein the notch is a circumferential notch.

9. The breathing air tank and valve assembly of claim 2, wherein the quick-connect probe may be temporarily connected to the valve body by a threaded fitting.

10. The breathing air tank and valve assembly of claim 2, wherein the quick-connect probe is permanently connected to the valve body.

11. A cylinder valve for connection to a pressure vessel, comprising:
    a valve body having an interior;

a first fitting adapted to connect the valve body directly to the pressure vessel, thereby creating a fluid connection to the interior of the valve body;

a second fitting, the second fitting being an outlet adapted to connect the valve body to a first pressure reducer assembly; and a third fitting, the third fitting being an outlet and having a check valve, wherein the third fitting is adapted to connect the valve body to a second pressure reducer assembly to thereby provide an air path from the pressure vessel through the interior of the valve body to the second pressure reducer assembly.

12. The cylinder valve of claim 11, wherein the second fitting is a quick-connect probe for threadless connection to the first pressure reducer assembly.

13. The cylinder valve of claim 11, wherein the third fitting includes a conventional threaded fitting for connection to the second pressure reducer assembly.

14. The cylinder valve of claim 11, wherein the third fitting is a CGA-type fitting.

15. The cylinder valve of claim 11, further comprising a valve assembly that is adjustable between at least an open state and a closed state, wherein in the open state, an air path exists from the pressure vessel through the interior of the valve body to the second fitting, and in the closed state, no air path exists from the pressure vessel through the interior of the valve body to the second fitting, wherein the air path from the pressure vessel through the interior of the valve body to the second pressure reducer assembly exists regardless of whether the valve assembly is in the open state or the closed state.

16. The cylinder valve of claim 11, further comprising a valve assembly that is adjustable between at least an open state and a closed state, wherein in the open state, an air path exists from the pressure vessel through the interior of the valve body to the second fitting, and in the closed state, no air path exists from the pressure vessel through the interior of the valve body to the second fitting, wherein the valve assembly includes a hand wheel for adjusting the valve assembly between the open state and the closed state.

17. The cylinder valve of claim 12, wherein the quick-connect probe includes a probe tip and a notch interposed between the probe tip and the valve body.

18. The cylinder valve of claim 17, wherein the notch is a circumferential notch.

19. The cylinder valve of claim 12, wherein the quick-connect probe may be temporarily connected to the valve body by a threaded fitting.

20. The cylinder valve of claim 12, wherein the quick-connect probe is permanently connected to the valve body.

* * * * *